US009392464B2

(12) United States Patent
Stewart et al.

(10) Patent No.: US 9,392,464 B2
(45) Date of Patent: Jul. 12, 2016

(54) METHOD AND APPARATUS FOR PROVIDING USER EQUIPMENT ACCESS TO TV WHITE SPACE RESOURCES BY A BROADBAND CELLULAR NETWORK

(75) Inventors: Kenneth A. Stewart, Grayslake, IL (US); Colin D. Frank, Park Ridge, IL (US); Sandeep H. Krishnamurthy, Arlington Heights, IL (US); Ravi Kuchibhotla, Gurnee, IL (US); Robert T. Love, Barrington, IL (US); Ajit Nimbalker, Buffalo Grove, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 78 days.

(21) Appl. No.: 13/100,701

(22) Filed: May 4, 2011

(65) Prior Publication Data

US 2012/0281593 A1 Nov. 8, 2012

(51) Int. Cl.
*H04W 16/14* (2009.01)
*H04W 4/00* (2009.01)
(Continued)

(52) U.S. Cl.
CPC ............... *H04W 16/14* (2013.01); *H04W 4/00* (2013.01); *H04W 72/00* (2013.01); *H04W 36/0055* (2013.01); *H04W 72/04* (2013.01)

(58) Field of Classification Search
CPC . H04W 16/14; H04W 36/0055; H04W 72/04; H04W 4/00; H04W 72/00
See application file for complete search history.

(56) References Cited

U.S. PATENT DOCUMENTS 6,044,265 A * 3/2000 Roach, Jr. ............... 455/419
2009/0028120 A1* 1/2009 Lee ....................... H04W 48/16
370/338
(Continued)

FOREIGN PATENT DOCUMENTS

EP 2365725 A2 9/2011
EP 2384074 A1 11/2011
(Continued)

OTHER PUBLICATIONS

European Search Report, European Patent Office, Munich, Oct. 23, 2012, all pages.
(Continued)

*Primary Examiner* — Alpus H Hsu
*Assistant Examiner* — Walter Divito
(74) *Attorney, Agent, or Firm* — Lerner, David, Littenberg, Krumholz & Mentlik, LLP

(57) ABSTRACT

A broadband cellular network (BCN) provides a user equipment (UE) access to TVWS resources. The BCN authorizes the UE to access TVWS resources by conveying a mobile device identifier received from the UE, and a cell identifier associated with the UE's coverage area, to a Federal Communications Commission (FCC)-certified Database and receiving, from the Database, and storing an FCC ID associated with the UE and a set of available TVWS resources. The BCN then conveys, to the UE via a broadband cellular technology, a channel resource information element (CRIE) that includes the cell identifier and identifies the set of available TVWS resources. Subsequently, the BCN re-authorizes the UE to access TVWS resources based on the stored FCC ID and without re-conveying the mobile device identifier to the Database. The BCN further utilizes broadband cellular technology procedures to provide a "virtual" contact verification signal (VCVS) to the UE.

22 Claims, 10 Drawing Sheets

(51) Int. Cl.
  *H04W 72/00* (2009.01)
  *H04W 36/00* (2009.01)
  *H04W 72/04* (2009.01)

(56) References Cited

U.S. PATENT DOCUMENTS

| | | | |
|---|---|---|---|
| 2010/0195580 A1 | 8/2010 | Samarasooriya et al. | |
| 2010/0248631 A1* | 9/2010 | Chaudhri et al. | 455/62 |
| 2010/0255794 A1* | 10/2010 | Agnew | 455/77 |
| 2010/0303026 A1 | 12/2010 | Chaudhri et al. | |
| 2011/0028179 A1 | 2/2011 | Sawai et al. | |
| 2011/0090887 A1 | 4/2011 | Kim et al. | |
| 2011/0276394 A1 | 11/2011 | Chan | |
| 2011/0280228 A1 | 11/2011 | McCann et al. | |
| 2012/0039312 A1 | 2/2012 | Narkar et al. | |
| 2012/0058790 A1* | 3/2012 | Junell et al. | 455/509 |
| 2012/0108179 A1* | 5/2012 | Kasslin et al. | 455/67.13 |
| 2012/0264440 A1* | 10/2012 | Koskela et al. | 455/450 |
| 2012/0281594 A1 | 11/2012 | Stewart et al. | |
| 2012/0282959 A1* | 11/2012 | Abraham et al. | 455/500 |
| 2013/0163508 A1* | 6/2013 | Yu et al. | 370/315 |

FOREIGN PATENT DOCUMENTS

| | | |
|---|---|---|
| WO | 2005039205 A1 | 4/2005 |
| WO | 2010088586 A2 | 8/2010 |
| WO | 2010111150 A2 | 9/2010 |

OTHER PUBLICATIONS

"Unlicensed Operation in the TV Broadcast Bands; Final Rule", 47 CFR Parts 0 and 15, Federal Register, vol. 75, No. 233, Dec. 6, 2010, all pages.

Nekovee M: "A survey of cognitive radio access to TV White Spaces", Ultra Modern Telecommunications&Workshops,2009. ICUMT '09. International Conference on, IEEE, Piscataway, NJ, USA, Oct. 12, 2009, all pages.

European Search Report: European Patent Office, Oct. 15, 2012, all pages.

3GPP TS 23.003 v9.3.0 (Jun. 2010), "Technical Specification Group Core Network and Terminals; Numbering, addressing and identification (Release 9)" 76 pages.

3GPP TS 22.016 v10.0.0 (Mar. 2011), "Technical Specification Group Services and System Aspects; International Mobile station Equipment Identities (IMEI) (Release 10)" 8 pages.

* cited by examiner

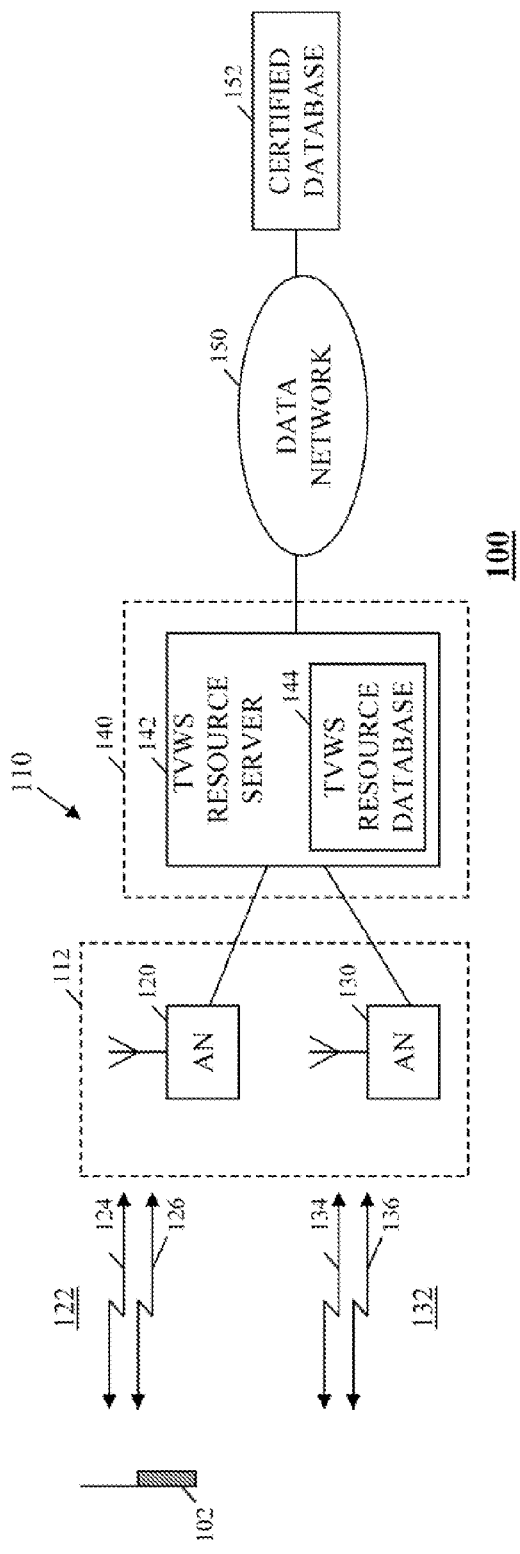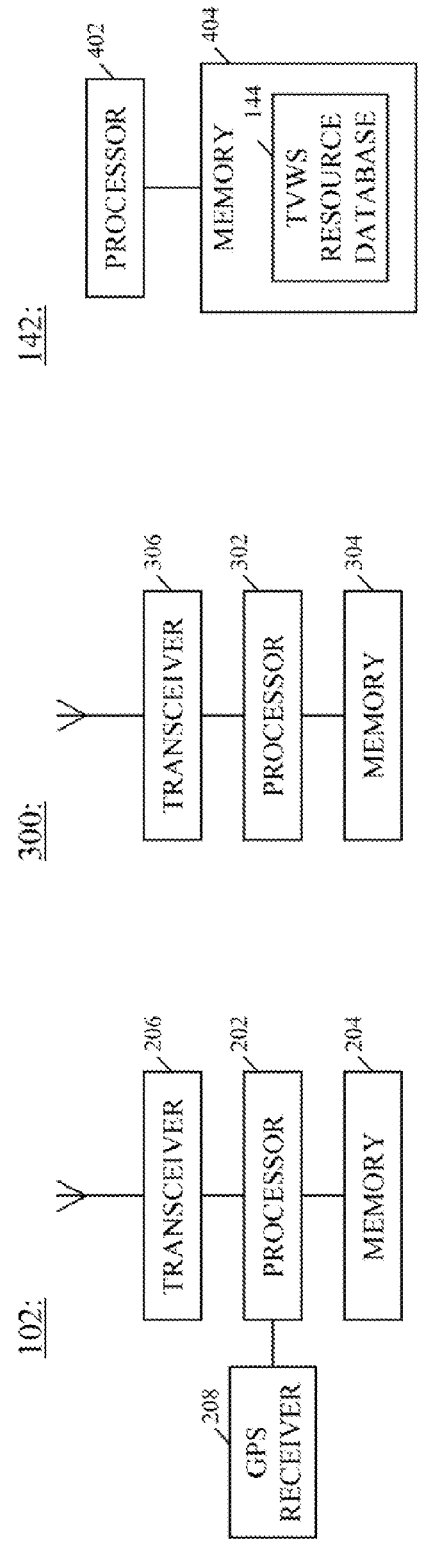
FIG. 1
FIG. 2
FIG. 3
FIG. 4

METHOD AND APPARATUS FOR PROVIDING USER EQUIPMENT ACCESS TO TV WHITE SPACE RESOURCES BY A BROADBAND CELLULAR NETWORK

CROSS-REFERENCE TO RELATED APPLICATION(S)

This application is related to U.S. patent application Ser. No. 13/100,750, entitled "METHOD AND APPARATUS FOR PROVIDING USER EQUIPMENT ACCESS TO TV WHITE SPACE RESOURCES BY A BROADBAND CELLULAR NETWORK," filed on the same date as this application, and which is assigned to the assignee of this application.

FIELD OF THE INVENTION

The present invention relates generally to wireless communication systems, and, in particular, to a provision of wireless services to users equipment by a broadband cellular network via both a licensed spectrum and unlicensed spectrum such as a TV White Space (TVWS) spectrum.

BACKGROUND OF THE INVENTION

The well-known problem of increasing data load on licensed networks, such as those of Verizon, AT&T, and others, means that such operators are seeking relief from spectrum constraints and accordingly are seeking to acquire or access additional wireless spectrum. In order to provide such spectrum relief, the Federal Communications Commission (FCC) has issued rules and regulations (47 C.F.R.) regarding an access of cellular devices to TV White Space (TVWS) spectrum, which FCC rules and regulations are referred to hereafter as the "TVWS rules." The TVWS rules make available, to devices, including cellular devices, low-frequency spectrum that would not normally be accessible to such devices. The TVWS spectrum can provide useful additional spectrum for conventional licensed networks, such as the HSPA (High Speed Packet Access) or 3GPP LTE (Third Generation Partnership Project Long Term Evolution) networks, being operated by those operators.

The TVWS rules adopted by the FCC would impose the following requirements upon a hybrid network and a hybrid user equipment (UE). First, the proposed TVWS rules require that a personal/portable TV band device (PPTVBD) must itself access an FCC-certified TV Band Database each time the PPTVBD is activated from a power off condition. In addition, whenever the PPTVBD changes location by more than 100 meters from the location of the most recent access to the FCC TV Band Database, the device is required to re-access the database. A Mode II PPTVBD also is required to re-access the FCC-certified TV Band Database at least once per day, regardless of a movement, or lack thereof, of the device. Additionally, a PPTVBD operating as a Mode I device must, when accessing the FCC-certified TV Band Database, either receive a contact verification signal (CVS), a signal defined by the FCC rules and regulations, or, in response to failing to receive the CVS, re-access the database.

Second, the proposed TVWS rules require that, when operating as a Mode I device, the PPTVBD's FCC identifier (FCC ID) must be validated by the entity providing the list of available TVWS channels. That is, upon each access to a network by a PPTVBD requesting to access a set of available TVWS channels, the network must pass the FCC ID of the Mode I device to the FCC-certified TV Band Database and then receive a list of allowed channels from the database.

Third, the CVS must be securely transmitted to a PPTVBD. That is, a CVS transmitted to a Mode I device must be encrypted to secure the identity of the transmitting device, such that only Mode I devices to whom the appropriate credentials have been delivered may access the CVS. This implies the construction and transmission of such a CVS. This also implies that the hybrid network must deliver to all PPTVBDs accessing the TVWS spectrum resource an appropriate key to access the CVS, which creates a significant key management overhead for the hybrid network operator.

As described above, the proposed TVWS rules present a number of obstacles to efficient operation of a hybrid broadband cellular/TVWS network. These rules work against low power operation of hybrid users equipment (UEs) and prevent efficient utilization of a radio interface by requiring excessive signaling, not to mention that the mandate that such signaling is to be "secured" also is inefficient. Compliance with the rules further imposes costs upon a hybrid UE by, in effect, requiring that the UE include a satellite-based position determination system and the additional current drain when it is enabled, such a Global Positioning System (GPS) receiver or some other Global Navigational Satellite System (GNSS) receiver, so that the UE is able to determine its location with a high degree of accuracy.

Therefore, a need exists for a method, apparatus, and system that provides the credential approval, secure communications, and location reporting desired for utilization of the of the TVWS spectrum by a hybrid broadband cellular/TVWS network without the inefficiencies and signaling overhead imposed by the proposed TVWS rules.

BRIEF DESCRIPTION OF THE DRAWINGS

FIG. 1 is a block diagram of a wireless communication system in accordance with an embodiment of the present invention.

FIG. 2 is a block diagram of a user equipment of the communication system of FIG. 1 in accordance with an embodiment of the present invention.

FIG. 3 is a block diagram of an eNodeB of the communication system of FIG. 1 in accordance with an embodiment of the present invention.

FIG. 4 is a block diagram of a TV White Space (TVWS) Resource Server of the communication system of FIG. 1 in accordance with an embodiment of the present invention.

Figure 5A:
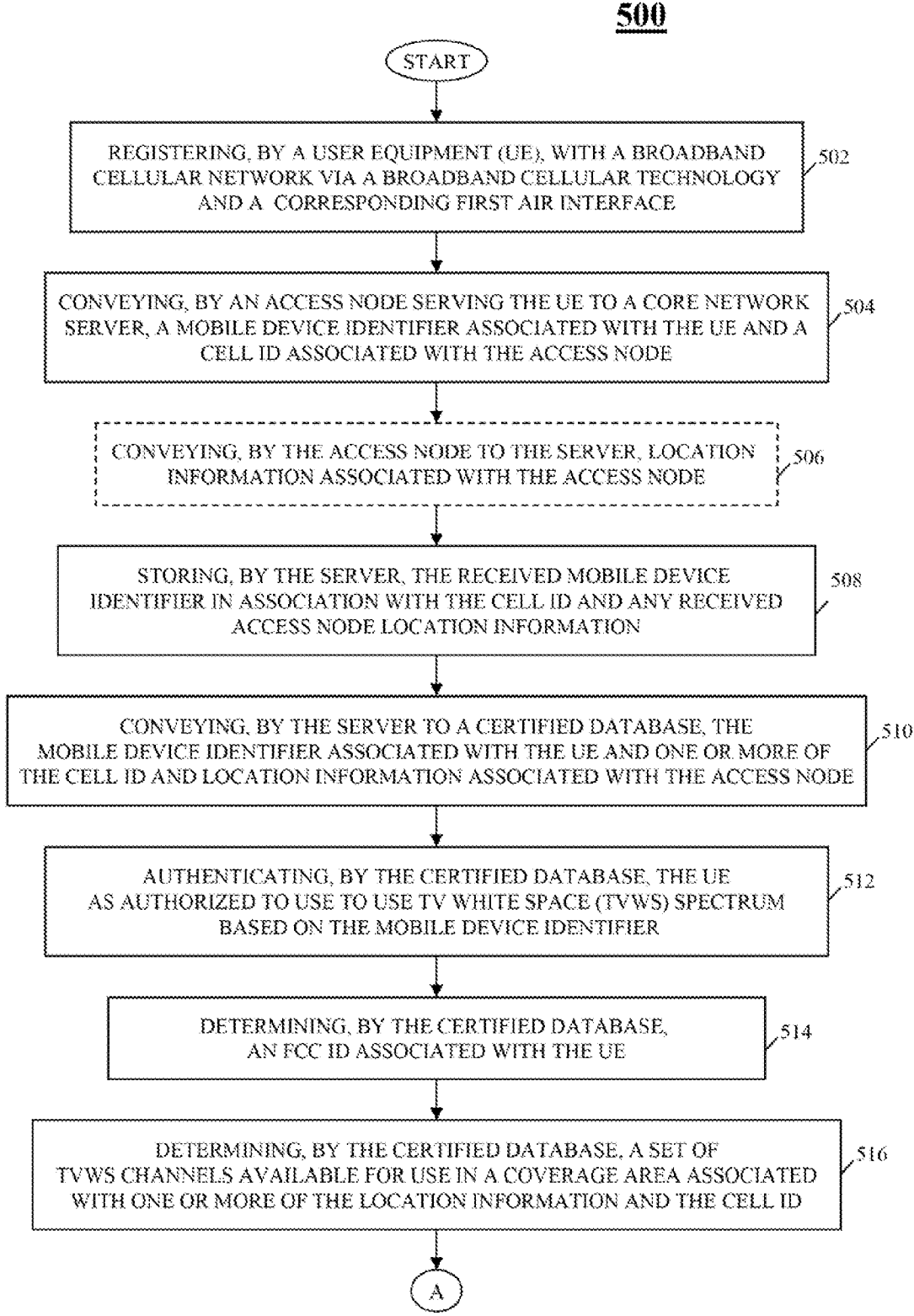
FIG. 5A is a logic flow diagram that illustrates a method, executed by the communication system of FIG. 1, whereby a broadband cellular network of the communication system provides wireless services to user equipment of the communication system in accordance with various embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method, apparatus, and system that provides the credential approval, secure communications, and location reporting desired for utilization of the of the TVWS spectrum by a hybrid broadband cellular/TVWS network without the inefficiencies and signaling overhead imposed by the proposed TVWS rules, a broadband cellular network is provided that provides a user equipment (UE) access to TVWS resources. The broadband cellular network authorizes the UE to access TVWS resources by conveying a mobile device identifier received from the UE, and a cell identifier associated with the UE's coverage area, to an certified Database and receiving, from the Database, and storing an FCC ID associated with the UE and a set of available TVWS resources. The broadband cellular network then conveys, to the UE via a broadband cellular technology, a channel resource information element (CRIE) that includes the cell identifier and identifies the set of available TVWS resources. Subsequently, the broadband cellular network re-authorizes the UE to access TVWS resources based on the stored FCC ID and without re-conveying the mobile device identifier to the Database. The broadband cellular network further utilizes one of more of known broadband cellular technology radio link connection states (active or Idle modes) and procedures such as radio link failure procedure and cell re-selection procedures to verify UE access to TVWS spectrum, that is, to provide a "virtual" contact verification signal (VCVS) to the UE via one or more of the available TVWS channels identified in the CRIE.

The TVWS rules and regulations allow unlicensed Television Band Devices (TVBDs) that are intentional radiators to operate on available TV channels in the broadcast television frequency bands such as 54-60 MHz, 76-88 MHz, 174-216 MHz, 470-608 MHz and 614-698 MHz. Note that other frequency bands (in broadcast television bands) may also be added or supported using same or similar rules and regulations.

Generally, an embodiment of the present invention encompasses a method for providing a user equipment access to TVWS resources by a broadband cellular communication network. The method includes receiving, from a UE, registration information comprising a mobile device identifier associated with the UE, storing the mobile device identifier in association with a cell identifier, wherein the cell identifier is associated with an access node serving the UE, authorizing the UE to access TVWS resources, wherein authorizing comprises conveying the mobile device identifier and the cell identifier to an certified Database and receiving, from the certified Database, a Federal Communications Commission identifier (FCC ID) associated with the UE and a set of available TVWS resources, storing, in a network element of the broadband cellular network, the FCC ID and the set of available TVWS resources, identifying the set of available TVWS resources to the UE, and subsequent to identifying the set of available TVWS resources to the UE, re-authorizing the UE to access TVWS resources based on the FCC ID stored in the network element and without re-conveying the mobile device identifier to the certified Database.

Another embodiment of the present invention encompasses a method for providing UE access to TVWS resources by a broadband cellular communication network. The method includes receiving mobile device identifier associated with a UE and a cell identifier, storing the mobile device identifier in association with the cell identifier in the at least one memory device, wherein the cell identifier is associated with an access node serving the UE, authorizing the UE to access TVWS resources, wherein authorizing comprises conveying the mobile device identifier and the cell identifier to an certified Database and receiving, from the certified Database, an FCC ID associated with the user equipment and a set of available TVWS resources, storing the FCC ID and the set of available TVWS resources in the at least one memory device, and subsequent to identifying the set of available TVWS resources to the UE, re-authorizing the UE to access TVWS resources based on the FCC ID stored at the server and without re-conveying the mobile device identifier to the certified Database.

Yet another embodiment of the present invention encompasses a method for providing UE access to TVWS resources by a broadband cellular communication network. The method includes receiving, from a UE, registration information comprising a mobile device identifier associated with the UE, conveying the mobile device identifier and the cell identifier to a broadband cellular network server, in response to conveying the mobile device identifier and the cell identifier to a broadband cellular network server, receiving identification of a set of available TVWS resources, and identifying the set of available TVWS resources to the UE by conveying, to the UE, a channel resource information element that comprises a set of available TVWS channels and the cell identifier.

Still another embodiment of the present invention encompasses a method for verifying UE access to TVWS spectrum. The method includes providing a virtual contact verification signal (VCVS) based on a broadband cellular technology control signal and determining whether a UE is still in contact with the VCVS based on one or more of a broadband cellular technology radio link failure and cell-reselection procedure.

Yet another embodiment of the present invention encompasses a broadband cellular network for providing user equipment access to TVWS resources by a broadband cellular communication network. The broadband cellular network includes an access node that is configured to receive, from a UE, registration information comprising a mobile device identifier associated with the UE. The broadband cellular network further includes a server in communication with access node, the server configured to store the mobile device identifier in association with a cell identifier, wherein the cell identifier is associated with an access node serving the UE, authorize the UE to access TVWS resources, wherein authorizing comprises conveying the mobile device identifier and the cell identifier to an certified Database and receiving, from the certified Database, an FCC ID associated with the UE and a set of available TVWS resources, and store the FCC ID and the set of available TVWS resources. Further, the access node is configured to identify the set of available TVWS resources to the UE and the server is configured to, subsequent to identifying the set of available TVWS resources to the user equipment, re-authorize the user equipment to access TVWS resources based on the FCC ID stored at the server and without re-conveying the mobile device identifier to the certified Database.

Still another embodiment of the present invention encompasses a broadband cellular network element. The broadband cellular network element includes an at least one memory device and an associated processor. The processor is configured to receive mobile device identifier associated with a UE and a cell identifier, store the mobile device identifier in association with the cell identifier in the at least one memory device, wherein the cell identifier is associated with an access node serving the UE, and authorize the UE to access TVWS resources, wherein authorizing comprises conveying the mobile device identifier and the cell identifier to an certified Database and receiving, from the certified Database, an FCC ID associated with the UE and a set of available TVWS resources. The processor further is configured to store the FCC ID and the set of available TVWS resources in the at least one memory device, and subsequent to identifying the set of available TVWS resources to the UE, re-authorize the UE to access TVWS resources based on the FCC ID stored at the server and without re-conveying the mobile device identifier to the certified Database.

Yet another embodiment of the present invention encompasses a broadband cellular network access node. The broadband cellular network access node includes an at least one memory device that is configured to maintain a cell identifier. The broadband cellular network access node further includes a processor configured to receive, from a UE, registration information comprising a mobile device identifier associated with the UE, convey the mobile device identifier and the cell identifier to a broadband cellular network server, in response to conveying the mobile device identifier and the cell identifier to a broadband cellular network server, receive identification of a set of available TVWS resources, and identify the set of available TVWS resources to the user equipment by conveying, to the user equipment, a channel resource information element that comprises a set of available TVWS channels and the cell identifier.

Still another embodiment of the present invention encompasses a broadband cellular network access node having a processor that is configured to convey, to a user equipment, a virtual contact verification signal (VCVS) based on a broadband cellular technology control signal and determine whether the user equipment is still in contact with the VCVS based on one or more of a broadband cellular technology radio link failure and cell-reselection procedure.

Yet another embodiment of the present invention encompasses a method in a UE to receive indication of availability of channel. The method includes receiving a channel resource information element (CRIE), the CRIE comprising a plurality of broadband cellular identifiers and a plurality of sets of channels, wherein each broadband cellular identifier of the plurality of broadband cellular identifiers is associated with a set of channels of the plurality of sets of channels, detecting a broadband cellular identifier associated with a broadband cellular technology, the cellular identifier embedded within at least one signal associated with the cellular technology, and selecting a set of available channels for use by the user equipment based on the received CRIE and the detected broadband cellular identifier.

Still another embodiment of the present invention encompasses a UE that includes a processor configured to receive a CRIE, the CRIE comprising a plurality of broadband cellular identifiers and a plurality of sets of channels, wherein each broadband cellular identifier of the plurality of broadband cellular identifiers is associated with a set of channels of the plurality of sets of channels, detect a broadband cellular identifier associated with a broadband cellular technology, the cellular identifier embedded within at least one signal associated with the cellular technology, and select a set of available channels for use by the user equipment based on the received CRIE and the detected broadband cellular identifier.

Yet another embodiment of the present invention encompasses a method of maintaining, in a UE, a valid state of a contact verification signal (CVS) associated with use of a spectrum. The method includes receiving a CRIE, the CRIE comprising a plurality of broadband cellular identifiers and a plurality of sets of channels, wherein each broadband cellular identifier of the plurality of broadband cellular identifiers is associated with a set of channels of the plurality of sets of channels, detecting an association to a cell with a broadband cellular identifier and a broadband cellular technology, the broadband cellular identifier embedded within at least one signal associated with the cellular technology, in response to detecting the association with the cell, determining that a state of a CVS detection in the UE is valid, determining a set of available channels for use by the UE based on the received CRIE and the detected broadband cellular identifier, and maintaining the valid CVS detection state based on the UE maintaining association with the cell.

Still another embodiment of the present invention encompasses a UE that includes an at least one memory device that maintains a valid state of a CVS associated with use of a spectrum. The UE further includes a processor that is configured to receive a CRIE, the CRIE comprising a plurality of broadband cellular identifiers and a plurality of sets of channels, wherein each broadband cellular identifier of the plurality of broadband cellular identifiers is associated with a set of channels of the plurality of sets of channels, detect a broadband cellular identifier associated with a broadband cellular technology, the broadband cellular identifier embedded within at least one signal associated with the cellular technology, in response to detecting the broadband cellular identifier, determine that a state of a CVS detection in the UE is valid, determine a set of available channels for use by the UE based on the received CRIE and the detected broadband cellular identifier, and maintain the valid CVS detection state based on the UE maintaining association with the cell.

Yet another embodiment of the present invention encompasses a method of indicating availability of channel. The method includes associating a set of available channels with a broadband cellular identifier associated with a broadband cellular technology, the set of available channels determined based on at least an indication from an authorized database, assembling at least a portion of a CRIE based on at least the association of the set of available channels with the broadband cellular identifier, and conveying, using the broadband cellular technology, the CRIE to a UE.

Still another embodiment of the present invention encompasses a broadband cellular network element. The broadband cellular network element includes a processor that is configured to associate a set of available channels with a broadband cellular identifier associated with a broadband cellular technology, the set of available channels determined based on at least an indication from an authorized database, assemble at least a portion of a channel resource information element based on at least the association of the set of available channels with the broadband cellular identifier, and convey, using the broadband cellular technology, the channel resource information element to a UE.

Yet another embodiment of the present invention encompasses a method in a broadband cellular network element of assembling a CRIE. The method includes receiving geographical location information associated with a coverage area of a broadband cellular network, conveying a query to a database for an indication of an availability of at least one channel based on the geographical location information, receiving from the database an indication of an availability of at least one channel in a portion of the coverage area, and assembling at least a portion of a CRIE by associating the indication of the availability of at least one channel with a broadband cellular identifier associated with the coverage area.

Still another embodiment of the present invention encompasses a broadband cellular network element. The broadband cellular network element includes a processor configured to receive at least one of location information associated with a coverage area of a broadband cellular network and a broadband cellular identifier associated with the coverage area, convey a query to a database for an indication of an availability of at least one channel based on one or more of the at least one of the location information and the broadband cellular identifier, receive from the database an indication of an availability of at least one channel in a portion of the coverage area, and assemble at least a portion of a channel resource information element by associating the indication of the availability of at least one channel with an identifier associated with the coverage area.

Yet another embodiment of the present invention encompasses a method for authenticating a UE. The method includes receiving a mobile device identifier associated the UE supporting a broadband cellular radio access technology, associating the mobile device identifier with an FCC ID associated with a device type of the UE, querying a database to determine whether the UE is authorized to operate in an unlicensed spectrum, wherein the query includes the FCC ID, in response to querying the database, receiving an indication that the UE is authorized to operate in the unlicensed spectrum, and based on the indication that the UE is authorized to operate in the unlicensed spectrum, conveying, to the UE, information that identifies at least a portion of the unlicensed spectrum.

Still another embodiment of the present invention encompasses a broadband cellular network element capable of authenticating a UE. The broadband cellular network element includes a processor configured to receive a mobile device identifier associated the UE via a carrier of a licensed spectrum and a broadband cellular radio access technology, associate the mobile device identifier with an FCC ID associated with a device type of the UE, query a database to determine whether the UE is authorized to operate in an unlicensed spectrum, wherein the query includes the FCC ID, in response to querying the database, receive an indication that the UE is authorized to operate in the unlicensed spectrum, and based on the indication that the UE is authorized to operate in the unlicensed spectrum, convey, to the UE, information that identifies at least a portion of the unlicensed spectrum.

The present invention may be more fully described with reference to FIGS. 1-12. FIG. 1 is a block diagram of a wireless communication system 100 in accordance with an embodiment of the present invention. Communication system 100 includes at least one user equipment (UE) 102, such as but not limited to a cellular telephone, a radio telephone, a smartphone, or a personal digital assistant (PDA), laptop computer, tablet computer, or personal computer with radio frequency (RF) capabilities. Communication system 100 further includes a broadband cellular network 110 that provides wireless cellular communication services to UEs, such as UE 102, residing in a coverage area of the broadband cellular network. Broadband cellular network 110 includes a Radio Access Network (RAN) 112 comprising multiple fixed wireless access nodes 120, 130 (two shown), such as a base station, a Node B, an eNodeB, or an access point, and a core network in communication with the RAN. In turn, core network 140 includes a TVWS Resource Server 142 in communication with RAN 112, in particular with the multiple fixed wireless access nodes 120, 130. Communication system 100 further includes a Database 152 of unlicensed, or unregulated, wireless resources, preferably TV Band, that is, TV White Space (TVWS) resources, which database is governmentally regulated, for example, may be Federal Communications Commission (FCC)-certified or authorized, and which database is in communication with broadband cellular network 110, and in particular with TVWS Resource Server 142, via an intervening public or private data network 150, such as the Internet. Database 152, referred to herein as "certified Database 152" or "authorized Database 152, is operated by a Federal Communications Commission (FCC) certified or authorized database operator as known in the art. As elements of broadband cellular network 110, access nodes 120, 130 and TVWS Resource Server 142 each may be referred to herein as a network element.

TVWS Resource Server 142 maintains, or has access to, from other core networks nodes such as a Home Subscriber Server (HSS), a Home Location Register (HLR), a Mobility Management Entity (MME), etc., registration and mobility information concerning each UE serviced by RAN 112 and includes a TV White Space (TVWS) Resource database 144 that maintains, or has access to, for each UE registered with broadband cellular network 110 and authorized to use the TVWS spectrum, an FCC ID associated with the UE and a mapping between the FCC ID and a mobile device identifier associated with the UE. As is known in the art, the FCC ID is an identifier assigned by the FCC, which is unique to a specific manufacturer's UE device or model type. TVWS Resource Database 144 further maintains a list of TVWS channels available to broadband cellular network 110, possibly including lists configured on a cell-specific, market-specific, or regional basis. For example, if the TVWS channels are not all available network-wide, the TVWS Resource Database 144 may maintain an association between each such TVWS channel and the cells where the TVWS channel is available. In other embodiments of the present invention, the functionality described herein as being performed by TVWS Resource Server 142 may instead be performed by software executed by one or more of the multiple access nodes 120, 130 of broadband cellular network 110 or on any other network element of broadband cellular network 110 that is in communication with the multiple access nodes 120, 130.

Each access node of the multiple access nodes 120, 130 is capable of providing wireless communication services to users equipment (UEs), such as user equipment (UE) 102, residing in a corresponding coverage area 122, 132 of the access node via multiple radio access technologies (RATs). More particularly, each access node 120, 130 is capable of providing wireless communication services via a corresponding first air interface 124, 134 associated with a first RAT, that is, a licensed wireless technology that utilizes a spectrum that is licensed by the network and/or an operator of the network. Preferably, the broadband cellular technology employed by broadband cellular network 110 is that of the 3GPP LTE (Third Generation Partnership Project Long Term Evolution) standards; however, one of ordinary skill in the art realizes that the principles described herein apply to any broadband cellular technology, such as any of the 3GPP Third Generation Partnership Project) WCDMA, GSM/EDGE, or High-Speed Packet Access (HSPA) standards, the 3GPP2 (Third Generation Partnership Project 2) Evolution standards, for example, the CDMA (Code Division Multiple Access) 2000 1XEV-DV standards, Wireless Local Area Network (WLAN) broadband standards, as described by the IEEE (Institute of Electrical and Electronics Engineers) 802.xx standards, for example, the 802.11, 802.16, or 802.21 standards, or any of multiple proposed ultrawideband (UWB) communication technologies and standards.

Further, each access node 120, 130 is capable of providing directly, or coordinating delivery via another access node, of wireless communication services via a corresponding second air interface 126, 136 associated with a second RAT, that is, a broadband wireless technology operating in TV White Space (TVWS) spectrum. This second RAT technology may be LTE, HSPA, GSM/EDGE etc. or may be IEEE 802.11 or some such. That is, UE 102 and access nodes 120, 130 may communicate within a subset of the available TVWS channels using any broadband cellular technology such as LTE, HSPA, etc. Similarly, UE 102 is a hybrid UE that is capable of engaging in wireless communications with broadband cellular network 110 via each of the multiple RATs. When utilizing the TVWS spectrum, broadband cellular network 110 and UE 102 may utilize protocols and associated signaling, such as traffic and control signals, associated with the first RAT, with the only difference being that the signaling is conveyed over the unlicensed spectrum, that is, the TVWS spectrum (air interfaces 126, 136) instead of over the licensed spectrum (air interfaces 124, 134).

In a 3GPP LTE communication system, downlink communications from an access node, referred to as an eNodeB (eNB) in LTE, to a UE, utilize orthogonal frequency division multiplexing (OFDM). In using OFDM, orthogonal subcarriers are modulated with a digital stream, which may include data, control information, or other information, to form a set of OFDM symbols. The orthogonal subcarriers may be contiguous or non-contiguous frequency bands, and the downlink data modulation may be performed using quadrature phase shift-keying (QPSK), 16-ary quadrature amplitude modulation (16QAM), or 64QAM.

Fourteen OFDM symbols are configured into a one millisecond (1 ms) downlink subframe for transmission from the base unit in the normal Cyclic Prefix (CP) case (and twelve OFDM symbols for the extended CP case). Within a subframe, data from a serving base unit is transmitted to its UEs on a Physical Downlink Shared CHannel (PDSCH) and control information is signaled on a Physical Downlink Control CHannel (PDCCH). In TDD, the sub frames on a carrier may be configured as downlink subframes, uplink subframes or a special subframe, which may contain a downlink portion, a guard period and an uplink portion.

Control information in the PDCCH is transmitted using scheduling messages of different predefined downlink control information (DCI) Formats. These scheduling messages inform a UE of the downlink control information (e.g., modulation and coding scheme, transport block size and location, pre-coding information, hybrid-ARQ (HARM) information, UE identifier, etc.) that is required to decode the downlink data transmissions in the PDSCH or to transmit the uplink data on the Physical Uplink Shared CHannel (PUSCH). This control information is protected by channel coding (typically, a cyclic-redundancy check (CRC) code for error detection and convolutional encoding for error correction), and the resulting encoded bits are mapped on the time-frequency resources of the downlink sub frame.

The smallest time-frequency resource unit for transmissions is denoted a resource element (RE), which is one OFDM symbol (smallest time unit) by one subcarrier (smallest frequency unit). A group of four REs (or four REs plus two reference signal REs) is called a resource element group (REG). Nine REGs can make a Control Channel Element (CCE). The encoded PDCCH bits are typically mapped onto 1, 2, 4, or 8 CCEs, which are referred to as aggregation levels 1, 2, 4, and 8.

The UE searches different hypotheses (i.e., hypotheses on the aggregation level, DCI Format size, etc.) by attempting to decode downlink transmissions using a finite number of allowable configurations. This process is referred to as "blind decoding." For example, a UE performs blind decoding using the starting CCE locations allowed for that particular UE. This UE-specific search space is typically configured during initial set-up of a radio link and can be modified using a Radio Resource Control (RRC) message. Similarly, a common search space is also defined that is valid for all UEs being served by the same eNB and might be used to schedule broadcast downlink information like Paging, Random Access Response, or others.

A particular UE must locate the CCEs corresponding to each PDCCH candidate it is to monitor (i.e., blindly decode for each subframe control region). The CRC of each PDCCH is typically masked (e.g., using an exclusive-OR operation) by an identifier corresponding to the user equipment that the base unit is trying to schedule. The identifier is assigned to the UE by its serving base unit. This identifier is known as a radio network temporary identifier (RNTI). There are several types of RNTIs, such as cell RNTIs (C-RNTIs), semi-persistent scheduling RNTIs (SPS-RNTIs), and temporary cell RNTIs (TC-RNTIs). When a UE decodes a PDCCH, it must apply the appropriate RNTI in the form of a mask to the PDCCH CRC for successful PDCCH decoding to occur. When a UE successfully decodes a PDCCH of a particular DCI Format type, it uses the control information from the decoded PDCCH to determine, for example, the resource allocation, hybrid-ARQ information, and power control information for the corresponding scheduled downlink data transmission.

In addition to PDCCH signaling, a control region of a downlink subframe also includes a Physical Hybrid-ARQ Indicator CHannel (PHICH) that is used to transmit hybrid-ARQ acknowledgements, reference signals, and a Physical Control Format Indicator CHannel (PCFICH). In the context of LTE Release 8, each eNB-to-UE downlink has 1, 2, or 3 OFDM symbols at the beginning of each subframe for control signals. The number of OFDM symbols in this control region may vary each subframe and is signaled via the PCFICH in that same subframe. In some cases, the value of PCFICH may be signaled via higher layer signaling or may be fixed.

All the remaining OFDM symbols in the subframe are typically considered the data region of the subframe, and these symbols create the PDSCH. PDSCH transmissions can be mapped into one or more resource blocks (RBs). Typically, an RB is a set of subcarriers and a set of OFDM symbols. For example, an RB may contain 12 subcarriers (with a subcarrier separation of 15 kHz) and 7 OFDM symbols, with some resource elements being assigned to carry pilot signals, etc. PDSCH allocations for a UE are typically scheduled in pairs of RBs, with each RB pair spanning a single subframe and indexed using a single RB identifier.

Release-10 LTE supports carrier aggregation wherein the UE may receive/transmit on multiple component carriers concurrently. The UE may receive PDCCH on each DL (downlink) component carrier or a subset of DL component carriers and rely on cross-carrier scheduling via Carrier Indicator Field (CIF) for PDSCH reception on one or more component carriers. Release-10 also supports Dedicated Reference Signal (DRS) based PDSCH demodulation, and defines enhanced signals such as new Channel State Information Reference Signals (CSI-RS) for channel measurements and feedback. The TVWS channels available to a UE may be employed as a component carrier via carrier aggregation techniques. For example, the available TVWS channels may use secondary component carriers or secondary cells wherein the PDCCH for the secondary cell is signaled in the control region of primary cell operating on a licensed carrier.

Referring now to FIGS. 2-4, block diagrams are provided of UE 102, an access node 300, such as access nodes 120 and 130, and TVWS Resource Server 142 in accordance with an embodiment of the present invention. Each of UE 102, access node 300, and TVWS Resource Server 142 includes a respective processor 202, 302, 402, such as one or more microprocessors, microcontrollers, digital signal processors (DSPs), combinations thereof or such other devices known to those having ordinary skill in the art. The particular operations/functions of processors 202, 302, and 402, and thus of UE 102, access node 300, and TVWS Resource Server 142, is determined by an execution of software instructions and routines that are stored in a respective at least one memory device 204, 304, 404, associated with the processor, such as random access memory (RAM), dynamic random access memory (DRAM), and/or read only memory (ROM) or equivalents thereof, that store data and programs that may be executed by the corresponding processor.

At least one memory device 204 of UE 102 further maintains a mobile device identifier (ID) associated with the UE, for example, a UE Identifier (UE_ID), a Mobile Station Identifier (MSID), a Mobile Equipment Identifier (MEID), an International Mobile Equipment Identity (IMEI), an International Mobile Subscriber Identity (IMSI), a Temporary Mobile Station Identifier (TMSI), a Temporary International Mobile Station Identifier (TIMSI), or any other identifier that identifies a UE to a network serving the UE that may occur to one of ordinary skill in the art. In addition, the at least one memory device 204 of UE 102 may maintain a Federal Communications Commission identifier (FCC ID). An FCC ID is an identifier that identifies an associated UE as a UE that is authorized, by the Federal Communications Commission (FCC). Typically, devices need to be authorized by FCC before they can legally be imported or sold in United States. The FCC ID may also be used to determine whether the UE is authorized to use the TVWS spectrum. While FCC is the governing entity in United States, other countries or jurisdictions may have their own communications regulatory entities providing similar functions with equivalent identifiers.

Further, at least one memory device 304 of access node 300 maintains an identifier associated with the broadband cellular network coverage area, such as a cell or a sector of a cell, serviced by the access node. The identifier may be a coverage area ID, such as a Cell ID, or an identifier of an access node that serves the coverage area, such as a base station identifier (BS_ID), a Node B identifier (Node B ID), or any other access node identifier that may occur to one of ordinary skill in the art (which identifiers are collectively referred to herein as a "cellular identifier," "broadband cellular identifier," "cell identifier," or "cell ID"). At least one memory device 304 of access node 300 also maintains a location identifier that identifies a geographical location of the access node, or has access to such a location (say, from a central registry of site locations), for example, a longitude and latitude of the location of the access node. Typically, such location information is programmed into the access node when the access node is installed.

Additionally, at least one memory device 404 of TVWS Resource Server 142 further maintains TVWS Resource Database 144.

Each of UE 102 and access node 300 further includes a respective radio frequency (RF) transceiver 206, 306 coupled to the corresponding processor 202, 302, which RF transceivers each includes one or more RF transmitters (not shown) and one or more RF receivers (not shown) for transmitting and receiving signals over the multiple air interfaces 124, 126, 134, and 136. In various embodiments of the present invention, each transceiver 206, 306 may include a single, wideband transmitter and a single, wideband receiver for transmitting and receiving signals over the multiple air interfaces, or may each include a separate transmitter/receiver pair in association with each air interface. Other combinations of transmitter/receiver pairs in association with different air interfaces may also be possible. UE 102 may further include a satellite positioning system 208, for example, a Global Positioning System (GPS) receiver or some other Global Navigational Satellite System (GNSS) receiver.

The embodiments of the present invention preferably are implemented within UE 102, access nodes 120 and 130, and TVWS Resource Server 142, and more particularly with or in software programs and instructions stored in the respective at least one memory devices 204, 304, 404 and executed by respective processors 202, 302, 402 of the UE, access nodes, and TVWS Resource Server. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 102, access nodes 120 and 130, and TVWS Resource Server 142. Based on the present disclosure, one skilled in the art will be readily capable of producing and implementing such software and/or hardware without undo experimentation. Further, unless otherwise specified herein, the functionality described herein as being performed by broadband cellular network 110 may be performed by a serving access node 120, 130, by TVWS Resource Server 142, or may be distributed between a serving access node 120, 130 and the TVWS Resource Server.

In order to more efficiently utilize the TVWS spectrum for communications between broadband cellular network 110 and UE 102, communication system 100 exploits a security or trust relationship that is established between an operator of broadband cellular network 110 and the UE when the UE registers for provision of broadband cellular services, establishes a trust relationship between the network operator and an operator of certified Database 152 that reduces a need for the UE to frequently re-register with the certified Database, and utilizes existing broadband cellular technology mobility procedures to allow a UE to roam among access nodes without the need to re-register with the certified Database. While the concepts described herein may be described in terms of the 3GPP LTE standards, as noted above one of ordinary skill in the art realizes that the concepts are not limited to 3GPP LTE communication systems and may be similarly applied to other broadband cellular technologies/communication systems as well.

Figure 5B:
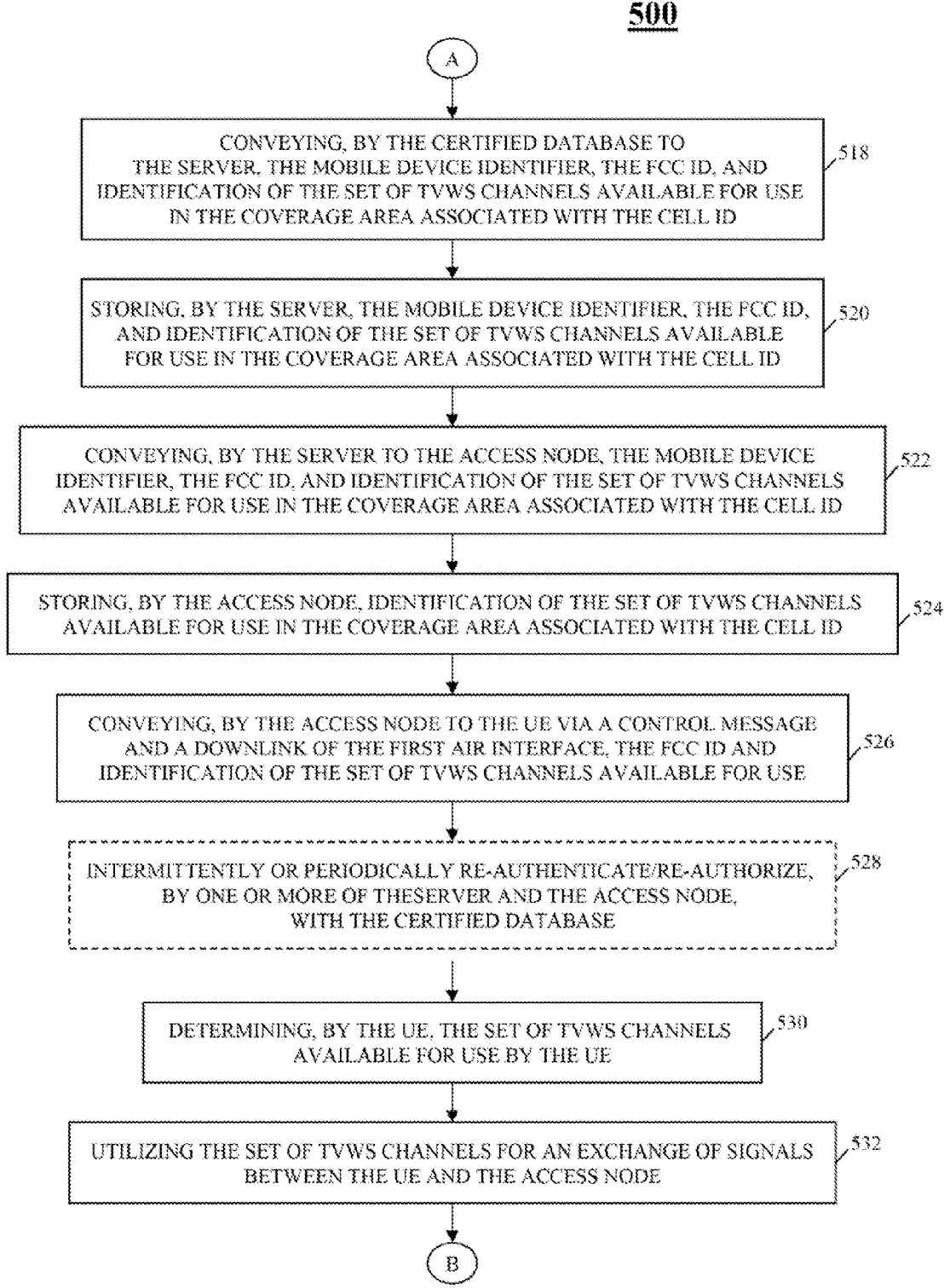
FIG. 5B is a continuation of the logic flow diagram of FIG. 5A illustrating a method, executed by the communication system of FIG. 1, whereby a broadband cellular network of the communication system provides wireless services to user equipment of the communication system in accordance with various embodiments of the present invention.
Figure 5C:
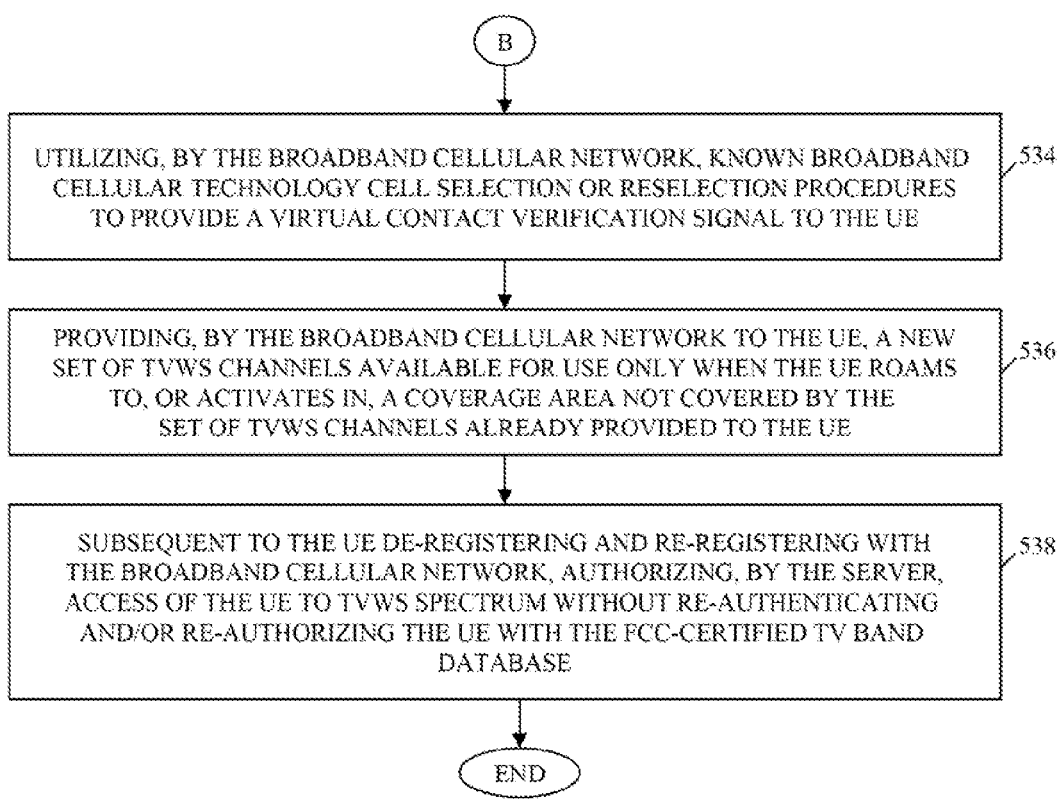
FIG. 5C is a continuation of the logic flow diagrams of FIGS. 5A and 5B illustrating a method, executed by the communication system of FIG. 1, whereby a broadband cellular network of the communication system provides wireless services to user equipment of the communication system in accordance with various embodiments of the present invention.

Referring now to FIGS. 5A, 5B, and 5C, a logic flow diagram 500 is provided that illustrates a method, executed by communication system 200, whereby broadband cellular network 110 provides wireless services to UE 102 in accordance with various embodiments of the present invention. Logic flow diagram 500 begins when UE 102 registers (502) with broadband cellular network 110 via a first RAT, that is, a broadband cellular technology, and a corresponding first air interface, such as air interface 124 with respect to access node 120, in accordance with known broadband cellular technology techniques. For example, UE 102 may activate in, or roam into, a coverage area of an access node 120, 130, of broadband cellular network 110, such as access node 120, and register with the access node via corresponding broadband cellular technology air interface 124 and in accordance with known broadband cellular, such as 3GPP LTE, techniques. As part of the registration information conveyed by UE 102 to access node 120, the UE conveys a mobile device identifier associated with the UE.

In response to receiving the mobile device identifier from UE 102, access node 120 conveys (504), to TVWS Resource Server 142, the mobile device identifier and a cell ID associated with the access node. Access node 120 further may convey (506), to TVWS Resource Server 142, location information associated with the access node, such as a location identifier or longitude and latitude information associated with the access node. Alternatively, the TVWS Resource Server 142 may have stored a previously generated list of access node locations, or may have access to a database of such locations via a companion server. In response to receiving the mobile device identifier and the cell ID from access node 120, TVWS Resource Server 142 stores (508), in at least one memory device 404 of the server, the received mobile device identifier in association with the received cell ID and any received access node location information, and the server registers with certified Database 152, and in particular authenticates the UE 102 with the certified Database, by conveying (510) the mobile device identifier and one or more of the location information and the cell ID to the certified Database via data network 150.

In an alternative embodiment, TVWS Resource Server 142 need not store the cell ID from access node 120, if the subsequent transmission of TVWS resource information has broader scope than the cell ID. For example, the TVWS resource information may include information for all cells in the network.

In yet another embodiment, TVWS Resource Server 142 need not convey (510) the mobile device identifier and the cell ID to the certified Database via data network 150. Rather the TVWS Resource Server 142 may convey the location of the cell and the FCC ID associated with device, rather than the specific device ID. Still further, the TVWS Resource Server 142 may elect not to convey this information in response to registration by a device to the network. Rather, for some or all of the FCC ID's known by TVWS Resource Server 142, the TVWS Resource Server may elect at any time to convey to certified Database 152 a query for the TVWS resources available to devices of type FCC ID at the location corresponding to the locations of some or all or the cells in the network. TVWS Resource Server 142 may elect only to execute such a query at a specific interval (e.g. once per day) or at a preferred time (e.g., during night time or hours of low traffic load for the network 112 or certified Database 152). In response to receiving one or more of the mobile device identifier, FCC ID, mobile device location information, cell ID or cell location from broadband cellular network 110, certified Database 152 authenticates (512) UE 102 (mobile device or device of type FCC ID). In other words, the certified Database 152, confirms, that the specific UE (or UE's of type FCC ID) are authorized to use the TVWS spectrum. The certified Database 152 may further determine (514) an FCC ID associated with the received mobile device identifier based on a mapping between the two identifiers maintained by the Database, but this is preferentially accomplished by the TVWS Resource Server 142. Further, based on one or more or the received cell ID or location information and cell ID, certified Database 152 determines (516) a set of TVWS resources, that is, a set of TVWS channels, available for use in a coverage area associated with the location information/cell ID. As used herein, the terms 'TVWS resources' and 'TVWS channels' are interchangeable. More specifically, certified Database 152 maintains, in association with one or more of broadband cellular network coverage area location information and broadband cellular network cell IDs, a set or list of available TVWS channel identifiers, for example, TVWS channel indices available for use in each such associated coverage area.

Certified Database 152 then conveys (518), to TVWS Resource Server 142, one or more of the mobile device identifier, the FCC ID associated with UE 102, and identification of the TVWS resources determined to be available in association with the cell ID or cell location, that is, available for use at access node 120. For example, certified Database 152 may convey, to TVWS Resource Server 142, the list of TVWS channel identifiers, for example, the TVWS channel indices, where, for example, each index identifies a carrier frequency on a raster of carrier frequencies. TVWS Resource Server 140 then stores (520) the FCC ID received for UE 102 (or may have previously stored this information, or had this information made available, for example, through another server, or by access a list of devices approved for operation on the network 112) in association with the UE 102 mobile device identifier, that is, stores a mapping between the FCC ID and the mobile device identifier, and further stores, in association with access node 120, for example, in association the cell ID associated with the access node, an identification of the TVWS resources, for example, the list of TVWS channel identifiers/indices, available at the access node. TVWS Resource Server 142 may also store information indicating the region around the cell location where the TVWS resource information is known to be valid. Certified Database 152 can convey, to TVWS Resource Server 142, identification of the TVWS resources determined to be available in association with the cell ID or cell location, that is, available for use at access node 120 and then rely on TVWS Resource Server 142 and/or the access node to manage the UE authentication.

TVWS Resource Server 142 then conveys (522), to access node 120, one or more of UE 102's FCC ID and mobile device identifier and an identification of the available TVWS resources. Access node 120 stores (524) the identification of the available TVWS resources and conveys (526) one or more of the FCC ID and an identification of the available TVWS resources to UE 102 via a downlink control message on air interface 124, or through some other access means, such as via connected access over Ethernet or via WiFi access.

One or more of access node 120 and TVWS Resource Server 142 may, intermittently or periodically, for example, once every 24 hours, re-authenticate, re-access or re-authorize (528) itself with certified Database 152, that is, provide one or more associated cell ID's or locations to the certified Database, and in return receive, from the certified Database, an updated list of TVWS resources available in association with the cell ID or location (which may be the same as the already stored list). Thus, access node 120 and TVWS Resource Server 142 may obtain an updated list of TVWS resources without also performing a UE authentication with certified Database 152 and may subsequently provide updated lists of TVWS resources to UEs already authenticated by the TVWS Resource Server with the certified Database, such as UE 102, without the need to re-authenticate and/or re-authorize the UEs with the certified Database. Thus, TVWS Resource Server 142 may be thought of as a 'proxy server' as it may function as a proxy for the certified Database with respect to served UEs and may function as a proxy for served, and already registered, UEs with respect to the certified Database.

The set of TVWS channels available to UE 102 may be provided by broadband cellular network 110 to the UE in the form of a list that is based on broadband cellular network cell IDs. That is, certified Database 152 maintains, in association with each broadband cellular network cell ID, a set or list of available TVWS channel identifiers (e.g., TVWS channel indices). For convenience, a list comprising one or more cell IDs and TVWS channel information associated with each such cell ID is referred to herein as a Channel Resource Information Element (CRIE). For a communication system with multiple deployed broadband cellular network radio access technologies (RATs), the CRIE may include cell ID's applicable to each such RAT.

Figure 6:
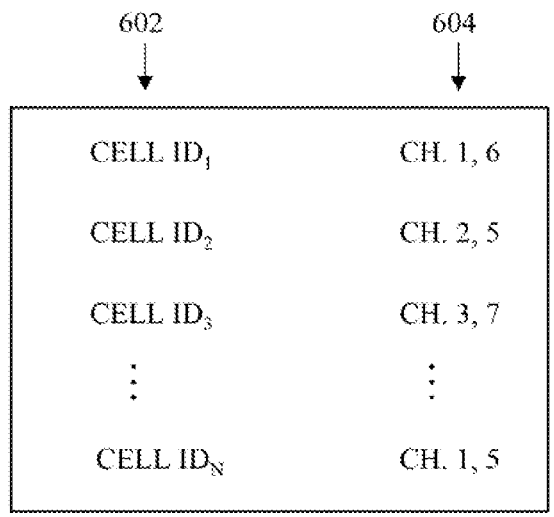
FIG. 6 is a block diagram of an exemplary channel resource information element (CRIE) in accordance with an embodiment of the present invention.

For example, FIG. 6 is a block diagram of an exemplary CRIE 600 in accordance with an embodiment of the present invention. As depicted in FIG. 6, the CRIE includes multiple ('N') cell IDs 602 and, in association with each cell ID, TVWS channel information 604. For example, a first cell ID, that is, cell $ID_1$, is associated with TVWS channels 1 and 6, that is, TVWS channels 1 and 6 are available for use in the coverage area associated with cell $ID_1$ (the numbering of the TVWS channels used in FIG. 6 is for illustration of the principles of the present invention and is not intended to necessarily be the number of the TVWS channels actually employed), a second cell ID, that is, cell $ID_2$, is associated with TVWS channels 2 and 5, that is, TVWS channels 2 and 5 are available for use in the coverage area associated with cell $ID_2$, a third cell ID, that is, cell $ID_3$, is associated with TVWS channels 3 and 7, that is, TVWS channels 3 and 7 are available for use in the coverage area associated with cell $ID_3$, and so on. However, in various embodiments of the present invention, a CRIE may include only a single cell ID and associated TVWS channel information, that is, the cell ID associated with the access node that will be transmitting the CRIE.

By way of another example, a CRIE—may include a first cell ID, cell $ID_1$, associated with a first set of available channels A, a second cell ID, cell $ID_2$,—associated with second set of available channels B, and a group of cell IDs, for example, cell ID' and cell $ID_3$, associated with a third set of available channels C. In addition, the CRIE may also include other parameters such as received signal strength indicator or other thresholds (pilot SNR, reliability metric, etc.) at which a UE would consider the cell as detectable. The CRIE may also include other information about how the recipient of CRIE may utilize the set of available channels, for example, emissions limit or maximum transmission power thresholds, etc. A UE receiving such a channel resource information element (CRIE) would, for example, select the first set of available channels A if it detects the first cell ID, cell $ID_1$, select the second set of available channels B if it detects the second cell ID, cell $ID_2$, and select the third set of available channels C if it detects the group of cell IDs, that is, cell $ID_1$ and cell $ID_3$.

TVWS Resource Server 142 assembles the CRIE and conveys the CRIE to access node 120. For each cell in broadband cellular network 110, TVWS Resource Server 142 maintains, in at least one memory device 404, one or more of a geographical location of the cell and a cell ID associated with the cell. TVWS Resource Server 142 may query certified Database 152 with respect to each such cell, for example, by conveying one or more of the geographical location of the cell or the cell ID associated with the cell, to certified Database 152 and receive, in return, a set of TVWS channels available to the cell, which set of TVWS channels then are stored by the TVWS Resource Server in association with the cell ID. In order to reduce the number of queries, TVWS Resource Server 142 may associate all cell ID's for all RAT's which share the same location (e.g., sectors of the same cell site installation) into a single query. In another embodiment of the present invention, TVWS Resource Server 142 may query certified Database 152 in regard to sub-sections of the cell, for example, sectors of a cell, and in return receive a set of TVWS channels available to the cell sub-section and then establish a set of TVWS channels that are commonly available across the cell for use at access node(s) serving the cell. At scheduled intervals, for example, every 24 hours, TVWS Resource Server 142 then may re-query certified Database 152 and update all, or some portion (a "leaf"), of the CRIE-associated objects, that is, the TVWS channels allocated to the coverage areas of broadband cellular network 110.

Access node 120 may convey the CRIE to UE 102 in a number of possible ways. For example, access node 120 may provide the CRIE periodically via a system information message on a common control channel, for example, a Broadcast Control Channel (BCCH), a Synchronization Channel (SCH), or a Physical Broadcast Channel (PBCH). By way of another example, in order to provide a degree of security in delivering the available TVWS channel information to the UE, that is, in order provide some assurance of a secure delivery of this information only to an authorized UE, an operator of broadband cellular network 110 may choose to deliver the information via a service device management (DM) procedure, such as an Open Mobile Alliance (OMA) DM transaction, or other secure client-server connection, for example, a Hypertext Transfer Protocol Secure (HTTPS) connection. The information object comprising the CRIE may also be transferred when the device is associated with a WiFi access point, again, for example, using an HTTPS connection.

A geographical scope of the CRIE may be broadband cellular network-wide or may be applicable to only a portion of the broadband cellular network, such as a single cell or a limited number of cells. That is, a list of available TVWS channels applicable to all cells in a network, for example, associated with a Public Land Mobile Network (PLMN) identity, may be provided to TVWS Resource Server 142, access node 120, and UE 102. Or the CRIE may have a regional scope, with only a selected subset of cells in the broadband cellular network listed in the CRIE. Extensions to regional information may be provided when the UE leaves the region.

Based on the received CRIE, UE 102 determines (530) the set of TVWS channels that are available for use by the UE. In one embodiment of the present invention, at least a portion of the set TVWS channels available for use by the UE then may be used (532) for an exchange of both uplink and downlink transmissions between UE 102 and a serving access node, that is, access node 120, that is, UE 102 conveys uplink transmissions to access node 120, and receives downlink transmissions from the access node, via air interface 126. In another embodiment of the present invention, to conserve UE power and to minimize interference with the TVWS channels not being used by the UE, at least a portion of the set of TVWS channels available for use by the UE may be used only for downlink transmissions to the UE by access node 120 or for uplink transmissions by the UE to access node 120, via air interface 126, and concurrent transmissions in the other direction may use air interface 124, that is, may use at least a portion of broadband cellular network 110's licensed spectrum by broadband cellular network 110. In yet another embodiment, the UE may use the set of identified TVWS channels for communication with another UE.

In determining the set of TVWS channels that are available for use by the UE, that is, when interpreting a received CRIE, UE 102 may assume that for each cell identified in the CRIE, the associated set of TVWS channels are available throughout the cell. That is, as is known in the art, a UE is required, whether in connected or idle mode, to always maintain an identifier, that is, a cell ID, of a serving cell, such as an identifier associated with serving access node 120. So long as UE 102 continues to be served by the same cell, or access node, the UE may assume that the same set of TVWS channels are available for the UE's use and need not obtain a new set of TVWS channels from broadband cellular network 110. Or, if the identifier maintained by the UE is listed in a CRIE which has been transferred to the device, again the device need not obtain a new set of TVWS channels from broadband cellular network 110. Another method of maintaining a cell identifier, that is, verification that UE 102 continues to be served by a cell 120 with a given cell ID, is to use the radio link failure mechanism of cell 120 such that as long as radio link failure has not occurred then UE 102 may assume that the same set of TVWS channels associated with the serving cell 120 (e.g. based on its cell ID) are available for UE 102 use without the need to obtain a new set of TVWS channels (or without the need to verify the existing TVWS channels from the most recent CRIE) from broadband cellular network 110.

Broadband cellular network 110 also minimizes a UE's need to re-obtain a set of TVWS channels from broadband cellular network 110, and more particularly to re-register with an certified Database, by implying, based on known broadband cellular technology cell selection and reselection procedures, that the UE is able to receive a contact verification signal (CVS), which CVS is described by the FCC rules and regulations. That is, the FCC rules and regulations propose that a UE, such as UE 102, provided TVWS channels available for use by the UE, verify, every 60 seconds, that the UE is still in contact with the serving access node, that is, access node 120, that provided the set of available TVWS channels. More particularly, the proposed FCC rules and regulations require that a UE verify, every 60 seconds, that the UE is able to receive a contact verification signal (CVS) transmitted by a serving access node. When the UE fails to detect the CVS, a link failure is assumed and the UE is required to re-access or re-register with an certified Database This consumes system overhead and UE power as an idle UE must wake up to receive the CVS. To conserve system overhead and UE power, broadband cellular network 110 utilizes (534) one of more of the known broadband cellular technology radio link failure procedure and cell re-selection procedures to verify user equipment access to TV White Space spectrum, that is, in idle mode, and handoff procedures in active mode, to provide a "virtual" contact verification signal (VCVS) to UE 102 via one or more of the available TVWS channels identified in the CRIE.

That is, when the UE selects any cell/access node associated with the cell IDs included in the CRIE provided to the UE, or actively exchanges information with such a cell/access node while in an active mode, broadband cellular network 110 utilizes the broadband cellular network messages exchanged as part of cell selection/reselection of information exchange as a VCVS. The VCVS may be constructed by a cell selection function or a radio link failure (RLF) function of a serving access node, such as access node 120, which functionality comprises software maintained by the at least one memory device 304 of each access node and executed by the corresponding processor 302. The VCVS is based on a broadband cellular network control signal. Any broadband cellular technology broadcast or reference signal conveyed by an access node to a UE may be used as a VCVS. For example access node then conveys the VCVS to the UE by re-using without modification, or modifying, a known common control signal, such as, in a 3GPP LTE communication system, a primary synchronization signal (PCH), a secondary synchronization signal (SCH), a real or virtual paging channel (where virtual paging channel is based on SNR or quality estimates derived from receiving corresponding PDCCH with DCI format 1C or 1A that is typically used to schedule an actual paging channel), or a Master Information Block (MIB) embedded in a Physical Broadcast Channel (PBCH), may serve as a VCVS to act as, or include, the VCVS. By way of further example, other common control signals that may be adopted or modified to act as, or include, the VCVS may include a Primary Common Pilot Channel (P-CPICH) in a Wideband Code Division Multiple Access (WCDMA) communication system, a Broadcast Control Channel (BCCH) in a Global System for Mobile Communications (GSM) communication system, and so on. Thus a broadcast/reference/common control signal, already utilized as part of known control signaling, may function as a VCVS that is used by the UE to verify that it is still in contact with the access node for TVWS re-registration purposes.

Broadband cellular network 110, and in particular a serving access node, that is, access node 120, then determines whether UE 102 is still in contact with the access node's VCVS based on one or more of a broadband cellular network radio link failure procedure and a broadband cellular network cell-reselection procedure, which procedures are known in the art. That is, such procedures provide for a UE and a serving access node to determine whether a radio link between the UE and the access node is still acceptable based on a control signal transmitted to the UE and a corresponding response, if any, received from the UE. Employing such procedures with respect to the VCVS transmitted by access node 120, the serving access node determines whether UE 102 continues to be compliant with contact verification signal (CVS) requirements.

By providing for a "virtual" contact verification indication, broadband cellular network 110 reduces the need for the serving access node to frequently, that is, as frequently as every 60 seconds as proposed by the FCC, convey a contact verification signal (CVS) to the UE that informs the UE of TVWS resources available to the UE and has the advantages of adding zero additional burden to the UE to receive, detect and process one or more CVSs. It also removes any radio resource load associated with querying certified Database 152 over an air interface. Further, the UE is not forced to act as a Mode II device and to subsequently maintain 50 meter positional accuracy and to detect any change in position of 100 meters or more as proposed by the FCC. A Mode I device may be a personal/portable device that may not have a geo-location capability and hence relies on a Mode II device to obtain a list of available channels. A Mode II device is a device that has geo-location capability and can query the FCC-certified TVWS Database with its location to obtain a list of available channels. The Mode II device can also assist Mode I device to obtain a list of available channels.

That is, a Mode II device, as known in the art, is a wireless device through which other wireless devices may connect to a cellular network. By contrast, a Mode I device, as known in the art, is a wireless device that may connect to a cellular network through a network or Mode II devices. The FCC rules and regulations provide different certified Database registration requirements for Mode I and Mode II devices. In particular, a Mode I device is not required to provide an autonomous means of self-location. By remaining in contact with a contact verification indication, or a "virtual" contact verification indication as in the present instance, a UE may operate as a Mode I device while not re-querying the certified Database 152 for the set of available TVWS channels responsive to a self-identified change of location or every 60 seconds as currently proposed by the FCC.

Referring again to logic flow diagram 500, when UE 102 engages in a cell reselection, for example, move from coverage of access node 120 to access node 130 and corresponding coverage area 122 to coverage area 132, broadband cellular network 110, and in particular TVWS Resource Server 142, may defer providing (536) another, second CRIE to the UE so long as the UE remains within the coverage area(s) associated with of the CRIE already provided to the UE (referred to herein as a first CRIE). That is, broadband cellular network 110, and in particular TVWS Resource Server 142, may provide the second CRIE to the UE only when the UE roams to, or activates in, a coverage area outside of the coverage area(s) associated with the first CRIE. For example, the CRIE may provide a set of TVWS resources available for use network-wide, for use in a single cell or with a single access node, or for use in a bounded area comprising multiple cells/access nodes, for example, the cells that the UE can see, that is, detect at a time that the UE was provided the CRIE. That is, as is known in the art, the UE may be required to periodically measure and report signal qualities, for example, signal strengths, for all reference signals, such as pilot signals, detected by the UE. Each such pilot signal may be associated with a different cell/access node. Based on the signals detected, measured, and reported by the UE, broadband cellular network 110, for example, a serving access node such as access node 120, is able to determine the cells/access nodes detected by a served UE, that is, UE 102. Serving access node 120 then may contact TVWS Resource Server 142 for a new CRIE for UE 102 only when the access node determines that the UE has detected a new cell/access node.

Further, should UE 102 de-register from broadband cellular network 110, for example, de-activate or roam outside of the broadband cellular network, and subsequently re-register with the broadband cellular network, for example, when re-accessing broadband cellular network 110 or any subsequent DM transaction with the UE, TVWS Resource Server 142 may only check (538) the mobile device identifier provided by the UE during such re-registration in order to re-authorize access of the UE to the TVWS spectrum, that is, available TVWS channels, and to re-authorize delivery of the CRIE to the UE, without re-authenticating and/or re-authorizing the UE with certified Database 152. In this way, TVWS Resource Server 142 again is functioning as a proxy for the certified Database. Logic flow diagram 500 then ends.

That is, TVWS Resource Server 142, as opposed to certified Database 152, may provide validation of the UE identifier via the associated FCC ID of any UE to which a CRIE is provided. The FCC ID is an identifier assigned by the FCC and is unique to a specific manufacturer's device or model type; however, individual instances of a particular UE type do not have distinct FCC ID's as all UEs of a particular model type share the same FCC ID. The FCC ID is assigned by the FCC during the type approval phase of the manufacture of a device, and may be stored by the network for subsequent association with the UE identifier of any UE of that type. The TVWS Resource Server 142 then maps the UE's mobile device identifier to the known FCC ID and stores the mapping, and further stores the received available TVWS spectrum in association with (that is, stores a mapping among) one or more of the UE's mobile device identifier and the received FCC ID. During any subsequent re-registration of the UE, such as UE 102, broadband cellular network 110, and in particular TVWS Resource Server 142, then utilizes the mobile device identifier provided by the UE during the re-registration process to re-authorize the UE to access the TVWS spectrum associated with the mobile device identifier without re-contacting certified Database 152.

An advantage here is that mobile device identifiers associated with a UE—such as IMEI, TMSI, IMSI, MEID, and so on—are already in use by UEs that support a broadband cellular technology, such as GSM Evolution (GSM/EDGE), HSPA or LTE. For example, the International Mobile Equipment Identity (IMEI) is a 14-16 digit identifier that is unique to an individual UE. Control of the procedure by which IMEIs are assigned largely resides with the worldwide GSM Association (GSMA). As described in 3GPP TS (Technical Specification) 22.016, an operator of broadband cellular network 110, may make administrative use of the IMEI to control access to the LTE network. For example, an operator may use an Equipment Identity Register (EIR) to define lists of IMEIs that are used to control network access.

Accordingly, well-established procedures already exist for a network operator to securely and reliably control access to a broadband cellular network, such as broadband cellular network 110, on the basis of a mobile device identifier, for example, an IMEI in the case of a 3GPP LTE network. Further, the EIR provides a fully secure means of recording a relationship established between the mobile device identifier, that is, the IMEI, of a UE, such as UE 102, and the FCC ID of the UE. Thus, having once established and recorded this mapping in the EIR, or any other mobile device profile database, for example, a Home Location Register (HLR) (not shown) in core network 140 or TVWS Resource Database 144, broadband cellular network 110, and in particular TVWS Resource Server 142, may identify those IMEIs which should be provisioned with the CRIE. This permits broadband cellular network 110 to make a one-time association, upon registration of a UE with the broadband cellular network, or upon notification during device type approval, of an IMEI associated with the UE and then associate an FCC ID with the IMEI, and then maintain the authorized set of TVWS resources allocable to any device with the specified FCC ID (along with any required subsequent and occasional re-query to establish that an authorized FCC ID is still authorized, which subsequent re-query may be performed by TVWS Resource Server 142 instead of the UE).

By establishing and storing, that is, caching, an association between a UE's FCC ID, mobile device identifier (such as the IMEI), and TVWS authorization status in a broadband cellular network, the frequent and repetitive querying by a UE of an certified Database, and the associated air interface and core network traffic load and resulting network congestion and access delays, are reduced.

Figure 7:
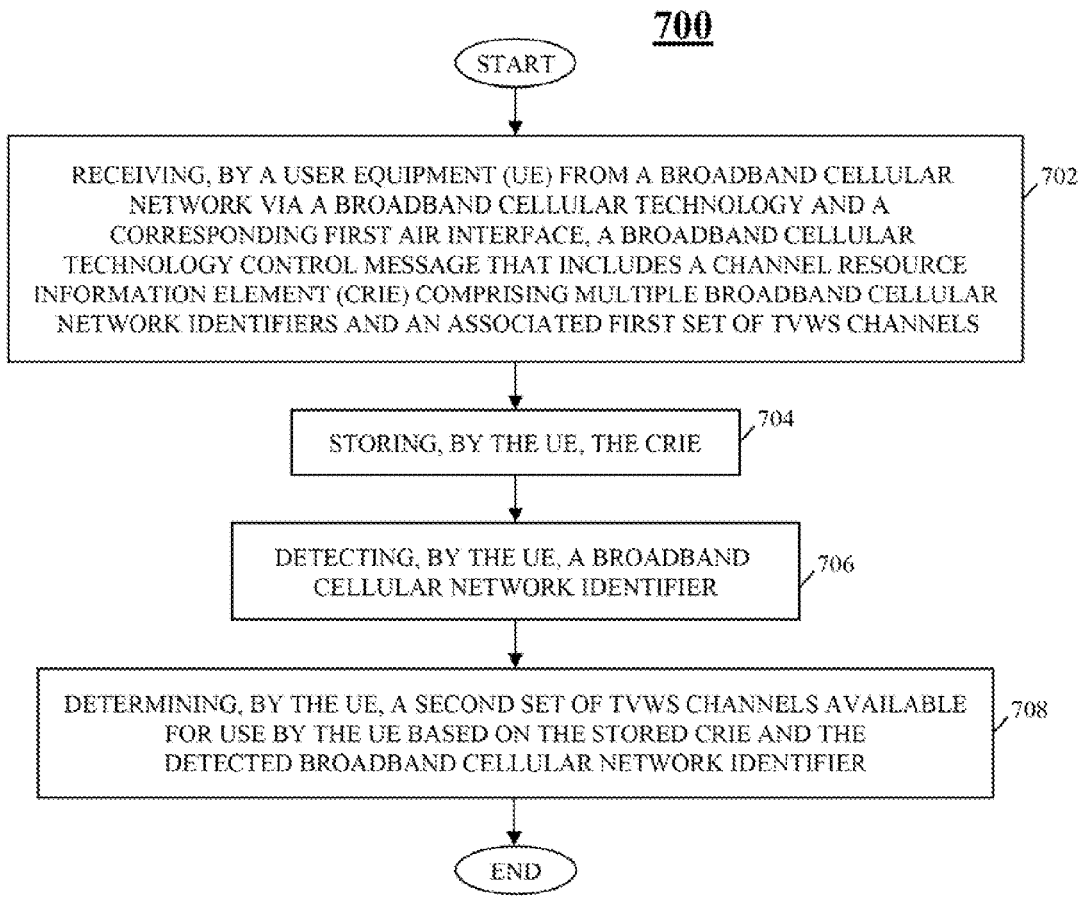
FIG. 7 is a logic flow diagram illustrating a method by which the broadband cellular network of the communication system of FIG. 1 provides, to a user equipment of the communication system of FIG. 1, an indication of an availability of a TVWS channel in accordance with various embodiments of the present invention.

Referring now to FIG. 7, a logic flow diagram 700 is provided that illustrates a method by which broadband cellular network 110 provides to UE 102 an indication of an availability of a TVWS channel in accordance with various embodiments of the present invention. Logic flow diagram 700 begins when the broadband cellular network 110, and in particular a serving access node, such as access node 120, conveys to UE 102, and the UE receives (702) from the broadband cellular network, a broadband cellular technology control message comprising a channel resource information element (CRIE) and stores (704) the CRIE in at least one memory device 204 of the UE. The CRIE comprises multiple broadband cellular network identifiers associated with a broadband cellular technology and a multiple sets of TVWS channels, wherein each broadband cellular network identifier of the multiple broadband cellular network identifiers is associated with a set of TVWS channels of the multiple sets of TVWS channels. The CRIE may be conveyed to the UE in response to the UE authenticating with broadband cellular network 110 pursuant to an authentication procedure associated with the broadband cellular technology supported by the broadband cellular network. Further, the CRIE may be conveyed to the UE by including the CRIE within at least one signal associated with the broadband cellular technology, that is, broadband cellular technology signal that is conveyed over a broadband cellular technology RAT, such as air interface 124 with respect to access node 120. The broadband cellular network identifiers may be cell IDs or may be an index formed by a combination of at least one of a primary synchronization signal, a secondary synchronization signal, or a primary broadcast channel information associated with the broadband cellular technology.

In one embodiment of the present invention, broadband cellular network 110 may convey the CRIE to the UE in response to the UE authenticating itself with a TVWS authorization entity, that is, TVWS Resource Server 142 and/or certified Database 152, without the need for the UE to provide GPS location information. That is, GPS receiver 208 of the UE may be disabled if the UE has one. In another embodiment of the present invention, broadband cellular network 110 may convey the CRIE to the UE in response to the in response to the UE authenticating itself with broadband cellular network 110 in accordance with well-known broadband cellular technology authorization procedures.

The CRIE then may be conveyed to the UE using one or more of a dedicated radio resource connection (RRC) message associated with the broadband cellular technology, a device management (DM) procedure associated with the broadband cellular technology, and a secure client-server connection as known in the art. Subsequent to receiving the CRIE, UE 102 detects (706) a broadband cellular identifier associated with a coverage area/access node serving the UE, for example, access node 120/coverage area 122, the broadband cellular identifier embedded within at least one signal associated with the broadband cellular technology, and selects (708) a set of available TVWS channels for use by the UE based on the received CRIE and the detected broadband cellular identifier. For example, the selected set of available TVWS channels may comprise one of the multiple sets of TVWS channels. For example, the UE may detect a broadband cellular identifier, such as a cell ID, broadcast by the serving access node in an overhead message, and based on the detected broadband cellular identifier and the stored CRIE, determines the available TVWS channels for use by the UE in the coverage area, that is, coverage area 122.

In another embodiment of the present invention, the set of available TVWS channels may be determined from a second CRIE that is different (e.g., larger) than the set of TVWS channels determined from the first CRIE received at step 702, due to, for example, the UE location information used for determining the first CRIE being much less accurate (e.g., no GPS enabled and only (internet protocol) IP address based location methods used resulting in relatively large geographic area due to location uncertainty) than a location that is based on being connected or camped on a cell of the broadband cellular network (e.g., still no GPS enabled but cell area quite a bit smaller than IP address based location area given cell ID has been obtained by the UE). Logic flow diagram 700 then ends.

Figure 8:
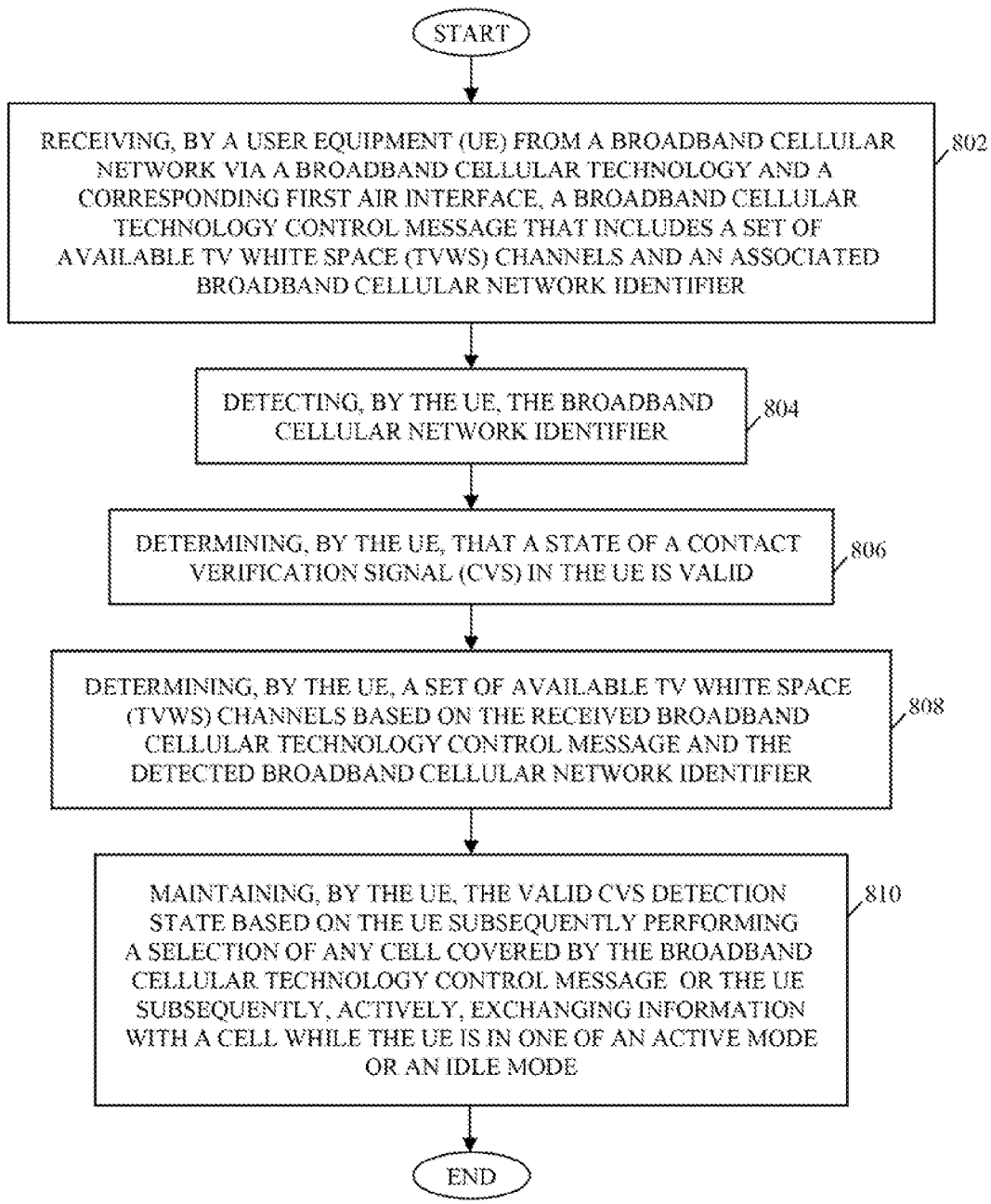
FIG. 8 is a logic flow diagram illustrating a method by which a user equipment of the communication system of FIG. 1 capable of supporting communications in both a broadband cellular technology and a TVWS technology maintains a valid state of a contact verification signal (CVS) associated with use of a TVWS spectrum in accordance with an embodiment of the present invention.

Referring now to FIG. 8, a logic flow diagram 800 is provided that illustrates a method by which a UE, such as UE 102, capable of supporting communications in both a broadband cellular technology and a TVWS technology maintains, in an at least one memory device 204, a valid state of a contact verification signal (CVS) associated with use of a TVWS spectrum in accordance with an embodiment of the present invention. In various embodiments of the present invention, the UE may be in a Radio Resource Connection (RRC) connected state to a cell/access node, or may be in an RRC idle state and camped on the cell/access node. Logic flow diagram 800 begins when the UE receives (802), from a broadband cellular network such as broadband cellular network 110, a CRIE. The CRIE includes a set of available TVWS channels and an associated broadband cellular network identifier associated with a broadband cellular technology, which broadband cellular identifier included within at least one signal associated with the broadband cellular technology. The UE detects (804) the broadband cellular identifier associated with a broadband cellular technology and, in response to detecting the broadband cellular identifier, determines (806) that a state of a CVS detection in the UE is valid, that is, determines that a CVS has been detected. The UE then determines (808) a set of available TVWS channels for use by the UE based on the received CRIE and the detected broadband cellular identifier. The UE then maintains (810) the valid CVS detection state based on the UE subsequently performing a selecting of any cell in the CRIE or the UE subsequently, actively, exchanging information with at least one cell while the UE is in one of active mode or idle mode, and logic flow diagram 800 then ends.

Figure 9:
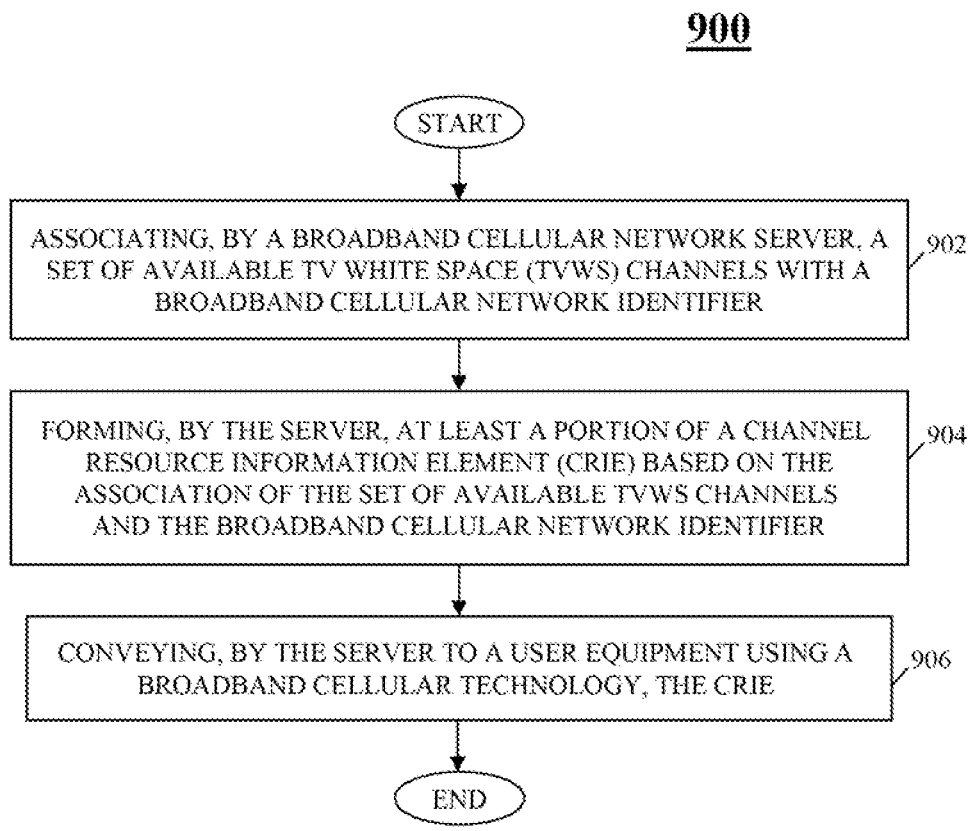
FIG. 9 is a logic flow diagram illustrating a method by which a TVWS Server of the communication system of FIG. 1 indicates an availability of a TVWS channel in accordance with an embodiment of the present invention.

Referring now to FIG. 9, a logic flow diagram 900 is provided that illustrates a method by which TVWS Server 142 indicates an availability of a TVWS channel in accordance with an embodiment of the present invention. Logic flow diagram 800 begins when TVWS Server 142 associates (902) a set of available TVWS channels with a broadband cellular identifier associated with a broadband cellular technology, the set of available TVWS channels determined based on at least an indication from an TVWS authorized database, that is certified Database 152. TVWS Server 142 further may determine the set of available TVWS channels based on one or more of a location of a coverage area/access node that is associated with the broadband cellular identifier and a cellular coverage area/access node that is associated with the broadband cellular identifier. TVWS Server 142 assembles (904) at least a portion of channel resource information element (CRIE) based on at least the association of the set of available TVWS channels with the broadband cellular identifier and conveys (906) the channel resource information element to a UE using the broadband cellular technology for example, over air interfaces 124 or 134, or some other transport mechanism. Logic flow diagram 900 then ends. Note that when establishing the set of TVWS channels, TVWS Server 142 may query certified Database 152 for TVWS channel availability at several locations in the cell, and then construct a CRIE on the basis of the entire set of received query responses—e.g., TVWS Server 142 may construct the CRIE on the basis of the set of TVWS channels available at all sampled locations in a cell.

Figure 10:
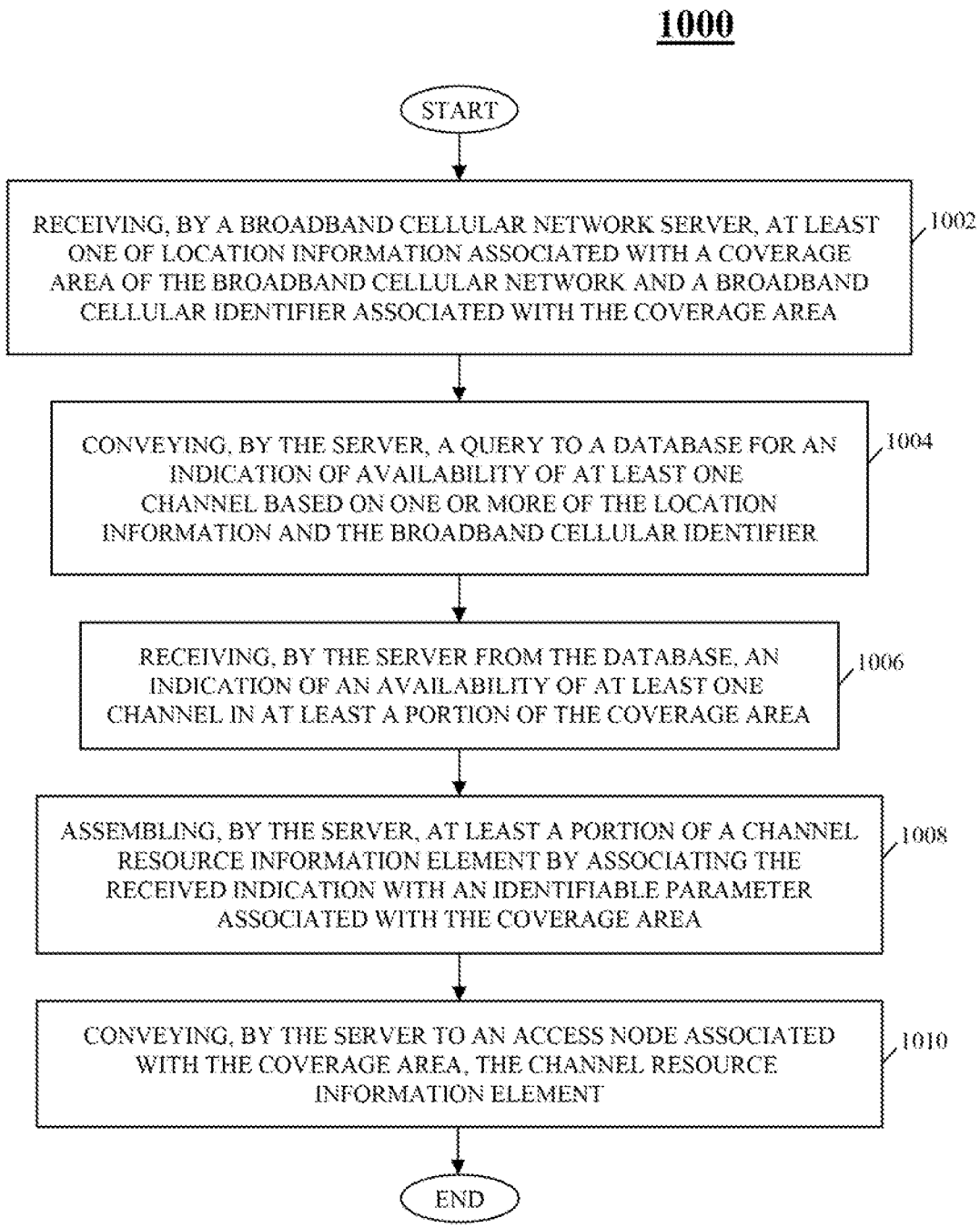
FIG. 10 is a logic flow diagram illustrating a method by which the TVWS Server of the communication system of FIG. 1 assembles a channel resource information element in accordance with an embodiment of the present invention.

Referring now to FIG. 10, a logic flow diagram 1000 is provided that illustrates a method by which TVWS Server 142 forms a CRIE in accordance with an embodiment of the present invention. Logic flow diagram 1000 begins when TVWS Server 142 receives (1002) at least one of location information associated with a coverage area of broadband cellular network 110, such as with access node 120/coverage area 122 or access node 130/coverage area 132, and a broadband cellular identifier associated with the coverage area. TVWS Server 142 then conveys (1004) a query to a database, and in particular certified Database 152, for an indication of availability of at least one TVWS channel based on one or more of the at least one of the location information and the broadband cellular identifier. In response to the query, TVWS Server 142 receives (1006) from the database, an indication of an availability of at least one TVWS channel in a portion of the coverage area and assembles (1008) at least a portion of a channel resource information element by associating the received indication with an identifiable parameter associated with the coverage area, such as a location of the coverage area or a broadband cellular identifier associated with the coverage area. TVWS Server 142 then conveys (1010) the channel resource information element to an access node associated with the coverage area, and logic flow diagram 1000 then ends.

Figure 11:
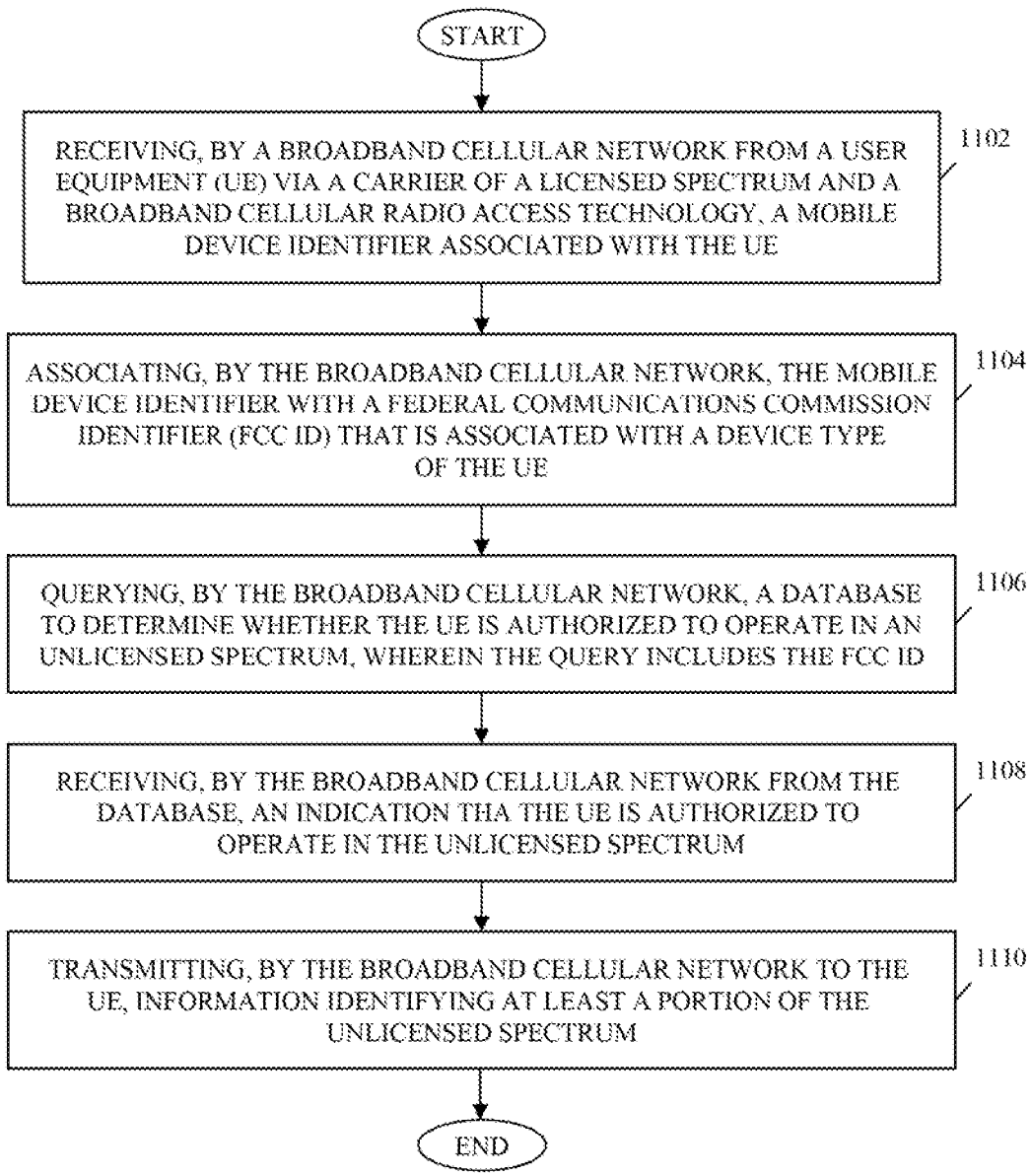
FIG. 11 is a logic flow diagram illustrating a method by which the broadband cellular network of the communication system of FIG. 1 authenticates a user equipment of the communication system of FIG. 1 in accordance with various embodiments of the present invention.

Referring now to FIG. 11, a logic flow diagram 1100 is provided that illustrates a method by which broadband cellular network 110, and in particular one or more of a serving access node, such as access node 120, and TVWS Resource Server 142, authenticates a UE, such as UE 102, in accordance with various embodiments of the present invention. Logic flow diagram 1100 begins when broadband cellular network 110 receives (1102), from the UE and via a carrier of a licensed spectrum and a broadband cellular RAT, a mobile device identifier associated with the UE. Preferably, the mobile device identifier is an International Mobile Subscriber Identity (IMSI), a Mobile Equipment Identifier (MEID); however, other mobile device identifiers as known in the art may be used herein without departing from the spirit and the scope of the present invention.

Broadband cellular network 110 then associates (1104) the mobile device identifier with a Federal Communications Commission identifier (FCC ID) associated with a device type of the UE, and queries (1106) a database, that is, certified Database 152, to determine whether the UE is authorized to operate in an unlicensed spectrum, wherein the query includes the FCC ID. In another embodiment of the present invention, Broadband cellular network 110 may query database 144 to determine whether the UE is authorized to operate in an unlicensed spectrum, wherein the query includes the FCC ID. In yet another embodiment of the present invention, the associating of the mobile device identifier with the FCC ID may be performed and registered in an Equipment Identity Register (EIR). Further, the broadband cellular network 110 may query the database, that is Database 152 or database 144, at any time, and not necessarily in response to the initial action of access by the UE at step 1102.

In response to querying the database, broadband cellular network 110 receives (1108), from the database, an indication that the UE is authorized to operate in the unlicensed spectrum and, based on the indication that the UE is authorized to operate in the unlicensed spectrum. In response to receiving the indication, broadband cellular network 110 transmits (1110), to the UE over a broadband cellular technology radio access technology, for example, over air interfaces 124 or 134, information identifying at least a portion of the unlicensed spectrum, such as a CRIE that identifies at least a portion of the unlicensed spectrum, which CRIE may be included in a broadband cellular technology control message. Logic flow diagram 1100 then ends.

Figure 12:
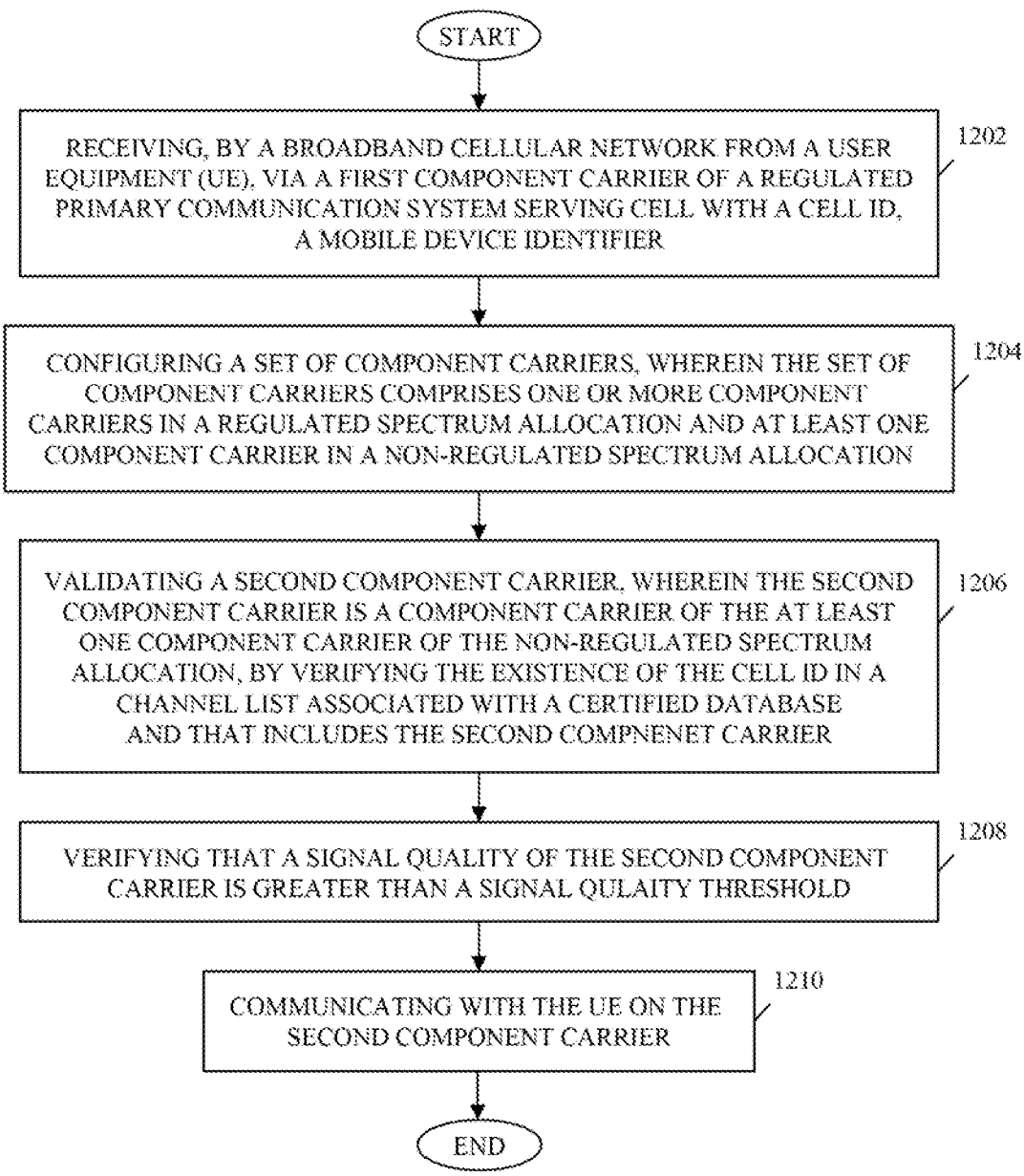
FIG. 12 is a logic flow diagram illustrating a method by which the communication system of FIG. 1 dynamically allocates spectrum to a user equipment operating within the spectrum in accordance with an embodiment of the present invention.

Referring now to FIG. 12, a logic flow diagram 1200 is provided that illustrates a method for dynamic spectrum allocation to a UE, such as UE 102, operating within the spectrum of a regulated primary communication system, such as within the broadband cellular technology supported by broadband cellular network 110, in accordance with an embodiment of the present invention. Logic flow diagram 1200 begins when the UE, that is, UE 102, reports to a broadband cellular network, that is, broadband cellular network 110, and the broadband cellular network, receives (1202) from the UE, on a first component carrier of a regulated primary communication system serving cell with a first cell ID, that is, receives at a serving access node/coverage area, such as access node 120/coverage area 122, via a first component carrier of a broadband cellular technology supported by the access node, a mobile device identifier.

In response to receiving signaling on the first component carrier, access node 120 configures (1204) a set of component carriers, wherein the set of component carriers includes one or more component carriers in a regulated (licensed) spectrum allocation and at least one component carrier in a non-regulated (unlicensed) spectrum allocation, validates (1206) a second component carrier, wherein the second component carrier is a component carrier of the at least one component carrier in the non-regulated spectrum, by verifying the existence of the cell ID in a channel list associated with certified Database 152 and that includes the second component carrier, verifies (1208) that a signal quality of the second component carrier, for example, a signal-to-noise ratio (SNR) of a received pilot associated with the second component carrier, is greater than a signal quality threshold, and communicates (1210) with the UE on the second component carrier. Logic flow 1200 then ends.

In another embodiment of the present invention, the UE, that is, UE 102, reports its mobile device identifier to a broadband cellular network, that is, broadband cellular network 110 on a first component carrier of a regulated primary communication system serving cell with a first cell ID with coverage area 122. UE 102 subsequently receives from access node 120 a configuration message for a set of component carriers (i.e. a component carrier configuration message), wherein the set of component carriers includes one or more component carriers in a regulated (licensed) spectrum allocation and at least one component carrier in a non-regulated (unlicensed) spectrum allocation and validates, a second component carrier, wherein the second component carrier is a component carrier of the at least one component carrier in the non-regulated spectrum, by verifying that a signal quality of the second component carrier, for example, a signal-to-noise ratio (SNR) of a received pilot associated with the second component carrier, is greater than a signal quality threshold where the signal quality threshold was previously signaled to the UE on the first component carrier (e.g. where it was included on either the component carrier configuration message or a component carrier activation message), and subsequently communicates using the second component carrier. The signal quality threshold is associated with the second component carrier cell ID in a channel list associated with certified Database 152 and that includes the second component carrier.

While the invention specifically discusses the accessing of available TVWS channels, it is noted that the same concepts can applied for other channels, including but not limited to, channels that are dynamically assigned, allocated or licensed. For example, it is possible in future that a regulatory (or a licensing authority) may set up a database that is operationally similar to certified Database 152 wherein the availability of channels becomes variable and hence requiring efficient techniques such as the embodiments in this description.

Further, in a preferred embodiment of the present invention, a broadband cellular network operator such as Verizon could associate spectrum made available under TVWS Rules with existing licensed spectrum. For example, Verizon could permit the operation of LTE downlink and uplink transmissions on TVWS spectrum by associating such spectrum with existing base stations or eNB's using LTE Band 13 and/or Band 4. Such an association could be established by using 3GPP Release 10 carrier aggregation methods, for example. Such coordinated use of both licensed and TVWS by a cellular entity is referred to herein as a "hybrid" mode of operation.

Again, while the description discusses the embodiments based on broadband cellular identifier and broadband cellular technology, it is noted that it applies to wireless identifier and wireless technology in general, including the IEEE 802.11, WiFi, Bluetooth, IEEE 802.16e and 16m, etc. In certain instances, the cell may also be referred to as an access point. In certain instances, the channel resource information element may be transmitted or received via one of a common control channel, RRC message associated with the cellular technology. The cellular identifier may also comprise of a global cell identifier, synchronization signal, or a preamble sequence.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a user equipment to receive indication of availability of channel, the method comprising:

receiving a channel resource information element (CRIE), the CRIE comprising a plurality of broadband cellular identifiers and a plurality of sets of channels, wherein a first broadband cellular identifier of the plurality of broadband cellular identifiers is associated with a first set of channels of the plurality of sets of channels such that the first set of channels are available for use in a coverage area associated with the first broadband cellular identifier, wherein a second broadband cellular identifier of the plurality of broadband cellular identifiers is associated with a second set of channels of the plurality of sets of channels such that the second set of channels are available for use in a coverage area associated with the second broadband cellular identifier, further wherein a new CRIE is provided to the user equipment based on at least one of a detection of a new access node and in response to the user equipment roaming to, or activating in, a coverage area outside of the one or more coverage areas associated with the plurality of broadband cellular identifiers of the CRIE already provided to the user equipment;

detecting a broadband cellular identifier associated with a broadband cellular technology, the cellular identifier embedded within at least one signal associated with the cellular technology; and selecting a set of available channels for use by the user equipment based on the received CRIE and the detected broadband cellular identifier, wherein the user equipment's access to the selected set of available channels is verified based on at least one of a radio link failure procedure of the broadband cellular technology, or a handoff procedure of the broadband cellular technology by using a control signal transmitted to the user equipment as part of the radio link failure procedure or handoff procedure as a virtual contact verification signal (VCVS), the VCVS serving as a proxy for a TV White Space (TVWS) contact verification signal (CVS) such that the user equipment can access TVWS spectrum without receiving the TVWS CVS.

2. The method of claim 1, wherein each set of channels of the plurality of sets of channels are Television White Space (TVWS) channels.

3. The method of claim 1, wherein receiving the channel resource information element (CRIE) is in response to the user equipment authenticating with an authorization entity.

4. The method of claim 1, wherein the step of receiving the channel resource information element comprises receiving through one of the following mechanisms:
   a dedicated radio resource connection (RRC) message associated with the cellular technology,
   a device management procedure associated with the cellular technology, and
   a secure client-server connection.

5. The method of claim 1, wherein receiving the channel resource information element is in response to the user equipment authenticating with an authorization procedure associated with the broadband cellular technology.

6. The method of claim 1, wherein the cellular identifier may be determined based on detection of at least one of a primary synchronization signal, secondary synchronization signal or a primary broadcast channel information associated with the broadband cellular technology.

7. The method of claim 1, wherein a Global Positioning System (GPS) receiver of the user equipment is disabled.

8. A user equipment comprising:
   a processor;
   a transceiver coupled to the processor for receiving and transmitting signals for the processor;
   a memory for sharing data accessible to the processor; and
   the processor configured to receive a channel resource information element (CRIE), the CRIE comprising a plurality of broadband cellular identifiers and a plurality of sets of channels, wherein a first broadband cellular identifier of the plurality of broadband cellular identifiers is associated with a first set of channels of the plurality of sets of channels such that the first set of channels are available for use in a coverage area associated with the first broadband cellular identifier, wherein a second broadband cellular identifier of the plurality of broadband cellular identifiers is associated with a second set of channels of the plurality of sets of channels such that the second set of channels are available for use in a coverage area associated with the second broadband cellular identifier, further wherein a new CRIE is provided to the user equipment based on at least one of a detection of a new access node and in response to the user equipment roaming to, or activating in, a coverage area outside of the one or more coverage areas associated with the plurality of broadband cellular identifiers of the CRIE already provided to the user equipment, detect a broadband cellular identifier associated with a broadband cellular technology, the cellular identifier embedded within at least one signal associated with the cellular technology, and select a set of available channels for use by the user equipment based on the received CRIE and the detected broadband cellular identifier, wherein the user equipment's access to the selected set of available channels is verified based on at least one of a radio link failure procedure of the broadband cellular technology, or a handoff procedure of the broadband cellular technology by using a control signal transmitted to the user equipment as part of the radio link failure procedure or handoff procedure as a virtual contact verification signal (VCVS), the VCVS serving as a proxy for a TV White Space (TVWS) contact verification signal (CVS) such that the user equipment can access TVWS spectrum without receiving the TVWS CVS.

9. The user equipment of claim 8, wherein each set of channels of the plurality of sets of channels are Television White Space (TVWS) channels.

10. The user equipment of claim 8, wherein the processor is configured to receive the channel resource information element (CRIE) in response to the user equipment authenticating with an authorization entity.

11. The user equipment of claim 8, wherein the processor is configured to receive the channel resource information element by receiving through one of the following mechanisms:
   a dedicated radio resource connection (RRC) message associated with the cellular technology,
   a device management procedure associated with the cellular technology, and
   a secure client-server connection.

12. The user equipment of claim 8, wherein the processor is configured to receive the channel resource information element in response to the user equipment authenticating with an authorization procedure associated with the broadband cellular technology.

13. The user equipment of claim 8, wherein the cellular identifier may be determined based on detection of at least one of a primary synchronization signal, secondary synchronization signal or a primary broadcast channel information associated with the broadband cellular technology.

14. The user equipment of claim 8, wherein a Global Positioning System (GPS) receiver of the user equipment is disabled.

15. A method of maintaining, in a user equipment (UE), a valid state of a contact verification signal (CVS) associated with use of a spectrum, the method comprising:
   receiving a channel resource information element (CRIE), the CRIE comprising a plurality of broadband cellular identifiers and a plurality of sets of channels, wherein each broadband cellular identifier of the plurality of broadband cellular identifiers is associated with a set of channels of the plurality of sets of channels, further wherein a virtual contact verification signal (VCVS) is provided to the user equipment via one or more set of channels of the plurality of sets of channels, such that the VCVS is based on a control signal;
   detecting an association to a cell with a broadband cellular identifier and a broadband cellular technology, the broadband cellular identifier embedded within at least one signal associated with the cellular technology;

in response to detecting the association with the cell, determining that a state of a CVS detection in the UE is valid using at least the VCVS;

determining a set of available channels for use by the UE based on the received CRIE and the detected broadband cellular identifier; and maintaining the valid CVS detection state based on at least one of the UE maintaining association with the cell and the VCVS, wherein the user equipment's access to the selected set of available channels is verified based on at least one of a radio link failure procedure of the broadband cellular technology, or a handoff procedure of the broadband cellular technology by using a control signal transmitted to the user equipment as part of the radio link failure procedure or handoff procedure as the virtual contact verification signal (VCVS), the VCVS serving as a proxy for a TV White Space (TVWS) contact verification signal (CVS) such that the user equipment can access TVWS spectrum without receiving the TVWS CVS.

16. The method of claim 15, wherein each set of channels of the plurality of sets of channels are Television White Space (TVWS) channels.

17. The method of claim 15, further comprising the user equipment being in a Radio Resource Connection (RRC) connected state to the cell.

18. The method of claim 15, further comprising the user equipment being in a Radio Resource Connection (RRC) idle state and camped on the cell.

19. A user equipment (UE) comprising:

a processor;

a transceiver coupled to the processor for receiving and transmitting signals for the processor;

an at least one memory device that maintains a valid state of a contact verification signal (CVS) associated with use of a spectrum; and wherein the processor is configured to receive a channel resource information element (CRIE), the CRIE comprising a plurality of broadband cellular identifiers and a plurality of sets of channels, wherein each broadband cellular identifier of the plurality of broadband cellular identifiers is associated with a set of channels of the plurality of sets of channels, further wherein a virtual contact verification signal (VCVS) is provided to the user equipment via one or more set of channels of the plurality of sets of channels, such that the VCVS is based on a control signal, detect a broadband cellular identifier associated with a broadband cellular technology, the broadband cellular identifier embedded within at least one signal associated with the cellular technology, in response to detecting the broadband cellular identifier, determine that a state of a CVS detection in the UE is valid using at least the VCVS, determine a set of available channels for use by the UE based on the received CRIE and the detected broadband cellular identifier, and maintain the valid CVS detection state based on at least one of the UE maintaining association with the cell and the VCVS, wherein the user equipment's access to the selected set of available channels is verified based on at least one of a radio link failure procedure of the broadband cellular technology, or a handoff procedure of the broadband cellular technology by using a control signal transmitted to the user equipment as part of the radio link failure procedure or handoff procedure as the virtual contact verification signal (VCVS), the VCVS serving as a proxy for a TV White Space (TVWS) contact verification signal (CVS) such that the user equipment can access TVWS spectrum without receiving the TVWS CVS.

20. The user equipment of claim 19, wherein each set of channels of the plurality of sets of channels are Television White Space (TVWS) channels.

21. The user equipment of claim 19, wherein the user equipment is in a Radio Resource Connection (RRC) connected state to the cell.

22. The user equipment of claim 19, wherein the user equipment is in a Radio Resource Connection (RRC) idle state and camped on the cell.

* * * * *